United States Patent
Itoh

(10) Patent No.: US 8,280,042 B2
(45) Date of Patent: Oct. 2, 2012

(54) DECRYPTION PROCESSOR AND DECRYPTION PROCESSING METHOD

(75) Inventor: Kouichi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 12/689,670

(22) Filed: Jan. 19, 2010

(65) Prior Publication Data
US 2010/0232603 A1  Sep. 16, 2010

(30) Foreign Application Priority Data
Jan. 19, 2009  (JP) .................................. 2009-8464

(51) Int. Cl.
G06F 21/00  (2006.01)

(52) U.S. Cl. ............... 380/30; 380/28; 726/23; 713/194
(58) Field of Classification Search .................... 380/30, 380/28; 713/194; 726/23
See application file for complete search history.

(56) References Cited

U.S. PATENT DOCUMENTS

| | | | | |
|---|---|---|---|---|
| 5,675,653 A * | 10/1997 | Nelson, Jr. | ........................ | 380/28 |
| 5,982,900 A * | 11/1999 | Ebihara et al. | ................... | 380/30 |
| 6,839,847 B1 * | 1/2005 | Ohki et al. | ..................... | 713/194 |
| 7,065,788 B2 * | 6/2006 | Yajima et al. | .................... | 726/23 |
| 7,286,666 B1 | 10/2007 | Coron | | |
| 2002/0126838 A1 * | 9/2002 | Shimbo et al. | ................... | 380/28 |
| 2002/0166057 A1 * | 11/2002 | Kaminaga et al. | ............. | 713/194 |
| 2005/0185791 A1 * | 8/2005 | Chen et al. | ........................ | 380/30 |
| 2008/0019508 A1 * | 1/2008 | Lipson | ............................ | 380/30 |
| 2009/0028323 A1 * | 1/2009 | Aciicmez et al. | ............... | 380/28 |

FOREIGN PATENT DOCUMENTS

| | | |
|---|---|---|
| JP | 4086503 B | 2/2008 |
| KR | 2002071327 A * | 9/2002 |
| WO | WO-00/59157 | 10/2000 |

OTHER PUBLICATIONS

Woo Seok et al, Asynchronous implementation of 1024-bit modular processor for RSA cryptosystem, 2000, IEEE, AP-ASIC 2000, 187-190.*
SeongHan Shin et al, A lower-bound of complexity for RSA-Based password-authenticated key exchanged, 2005, EuroPKI'05 proceeding of second European conference on public key infrastructure, pp. 191-205.*
Coron, Jean-Sebastien "Resistance against Differential Power Analysis for Elliptic Curve Cryptosystems", *Cryptographic Hardware and Embedded Systems (CHES'99)*, 1999, p. 292-302.

(Continued)

*Primary Examiner* — Oscar Louie
*Assistant Examiner* — Ali Shayanfar
(74) *Attorney, Agent, or Firm* — Fujitsu Patent Center

(57) ABSTRACT

A decryption processor for calculating a plaintext through decryption of a ciphertext c includes, a first part that calculates $m'_p$ through modular exponentiation modulo a first prime number p wherein an exponent is a shifted value of $d(mod(p-1))$, and a base is a value of $c(mod\ p)$; a second modular exponentiation part that calculates $m'_q$ through modular exponentiation modulo a second prime number q, wherein an exponent is a value of $d(mod(q-1))$ and a base is a value of $c(mod\ q)$; a composition part that calculates $m_s$ through calculation of $((u \times (m'_q - m'_p)(mod\ q)) \times p + m'_p$ by using the values $m'_p$ and $m'_q$ and a private key u corresponding to $p^{-1}(mod\ q)$; and a shift release part that calculates the plaintext m through calculation of $m_s \times (c^s(mod\ n))(mod\ n)$ by using the value $m_s$.

15 Claims, 24 Drawing Sheets

```
-input
c: ciphertext
n: modulus n satisfying n=p×q
-output
m: plaintext

- private key(stored in encryption device executing CRT_DEC of FIG.15)
dp: private key, satisfying dp =d mod(p-1)
dq: private key, satisfying dq =d mod(q-1)
p: private key, first prime number
q: private key, second prime number
u: private key, u=p⁻¹(mod q)

- work area
W: bit length of log₂n
S: bit length of (log₂n)/2

- Algorithm:m= CRT_DEC_counter1(c)
1601 S= (given as random number of the same bit length as p and q)
1602 Calculate W:=CRT_DEC(c×S (mod n)) by using algorithm of FIG.15
     (output W=(c×S)ᵈ (mod n))
1603 Calculate m:=CRT_DEC(S⁻¹(mod n)) by using algorithm of FIG.15
     (output m=S⁻ᵈ(mod n))
1604 Calculate m=W×m (mod n) (output (c×S)ᵈ× S⁻ᵈ=cᵈ(mod n))
1605 output m
```

OTHER PUBLICATIONS

Kocher, Paul et al., "Differential Power Analysis", *Proceedings of Advances in Cryptology-CRYPTO'99* 1999, p. 388-397.

Menezes, Alfred et al., "Handbook of Applied Cryptography" *Handbook of Applied Cryptography(CRC press.* 1996) 1996, p. 615.

Messerges, Thomas et al., "Power Analysis Attacks of Modular Exponentitiation in Smartcards", *Cryptographic Hardware and Embedded Systems(CHES'99)* 1999, p. 144-157.

* cited by examiner

FIG. 1

-input
c : ciphertext
n : modulus n satisfying n=p×q
-output
m : plaintext

- private key(stored in encryption device executing CRT_DEC of FIG. 15)
$d_p$ : private key, satisfying $d_p$ =d mod(p-1)
$d_q$ : private key, satisfying $d_q$ =d mod(q-1)
p : private key, first prime number
q : private key, second prime number
u : private key, $u=p^{-1}$(mod q)

- work area
W : bit length of $\log_2 n$
S : bit length of $(\log_2 n)/2$

- Algorithm:m= CRT_DEC_counter1(c)
1601 S= (given as random number of the same bit length as p and q)
1602 Calculate W:=CRT_DEC(c×S (mod n)) by using algorithm of FIG. 15
    (output W=$(c \times S)^d$ (mod n))
1603 Calculate m:=CRT_DEC($S^{-1}$(mod n)) by using algorithm of FIG. 15
    (output m=$S^{-d}$(mod n))
1604 Calculate m=W×m (mod n) (output $(c \times S)^d \times S^{-d} = c^d$(mod n))
1605 output m

FIG. 4

● Shift exponents $d_p$ and $d_q$ of CRT with constant s and release shifting after CRT composition
→The amount of computation necessary for calculation of a value $c^s \pmod{n}$ for releasing the shifting is largely reduced (to be negligibly small at the maximum when s = 2 or 3). The correction is performed through calculation of $c^s \pmod{n}$ from c, additional memory is very small. (A $\log_2 s$-bit memory for storing s is sufficient, which is 2 bits at most when s = 2 or 3.)

· input
c: ciphertext
· output
m: plaintext
· private key
$d_p$: private key, satisfying $d_p = d \mod (p-1)$
$d_q$: private key, satisfying $d_q = d \mod (q-1)$
p: private key, first prime number
q: private key, second prime number
u: private key, $u = p^{-1} \pmod{q}$ · Algorithm: m = CRT_DEC_Invent(c)
1901 $c_p := c \pmod p$ /* calculate remainder $c_p$ of c modulo p */
1902 $c_q := c \pmod q$ /* calculate remainder $c_q$ of c modulo q */
1903 $m'_p := c_p^{d_p - s} \pmod p$ /* modular exponentiation modulo p with base $c_p$ and exponent $d_p - s$ */
1904 $m'_q := c_q^{d_q - s} \pmod q$ /* modular exponentiation modulo q with base $c_q$ and exponent $d_q - s$ */
1905 $m_s := ((u \times (m'_q - m'_p)) \pmod q) \times p + m'_p$ /* calculate $m_s := c^{d-s} \pmod n$ as a result of CRT composition */
1906 $m := m_s \times (c^s) \pmod n$ /* execute release of shifting through $m := (c^{d-s}) \times (c^s) \pmod n = c^d \pmod n$ after CRT composition */
1907 output m Execution of shifting with exponents $d_p - s$ and $d_q - s$ Execution of shifting release after CRT composition

FIG. 5

2000  N $a_i (x \leq a_i < x + \varepsilon)$ are given to an encryption device for causing processing of CRT($a_i$) of FIG. 15. At this point, power consumption data $P(a_i, time)$ obtained in calculating $(a_i)^g \pmod{p}$ is measured with respect to all values of i.

2001  The entire set G of the power consumption data $P(a_i, time)$ is divided into the following sets $G_{1,j}$ and $G_{0,j}$ in accordance with the j-th bit value from the least significant bit of $a_i$ with respect to all values of $j = 0, 1, \cdots, g \times (\log_2 \varepsilon) - 1$.
- $G_{1,j} = \{P(a_i, time) \mid \text{j-th bit of } (a_i)^g = 1\}$
- $G_{0,j} = \{P(a_i, time) \mid \text{j-th bit of } (a_i)^g = 0\}$ 2002  A power difference curve $\Delta_j$ represented as $\Delta_j$ = (average power of $G_{1,j}$) − (average power of $G_{0,j}$) is created on the basis of sets $G_{1,j}$ and $G_{0,j}$.

2003  As a result, with respect to all curves with $j = 0, 1, \cdots, g \times (\log_2 \varepsilon) - 1$, when a spike as illustrated in FIG. 19(B) appears and the spike has a sufficient height, it is determined that $(x + \varepsilon)^g < p$.

FIG. 6

(A) $x^g = \sum_{i=0,1,\ldots,g} (_gC_i \; xp^{(g-i)/g} \times (-\varepsilon)^i) = p - g\varepsilon \; xp^{(g-1)/g} + g(g-1)\varepsilon^2/2 xp^{(g-2)/g} + \ldots + \varepsilon^g$
(whereas $_aC_b$ is a combination function and $_aC_b = (a \times (a-1) \times \ldots \times (a-b+1)) / (b \times (b-1) \times \ldots \times 1))$ (B) $x^g \approx p - \varepsilon g xp^{(g-1)/g}$

FIG. 7

- input
  c: ciphertext
- output
  m: plaintext
- private key
  $d_p$: private key, satisfying $d_p = d \mod (p - 1)$
  $d_q$: private key, satisfying $d_q = d \mod (q - 1)$
  p: private key, first prime number
  q: private key, second prime number
  u: private key, $u = p^{-1} \pmod q$
- parameter
  s: shift parameter for exponent (constant)

- Algorithm: m = CRT_DEC_Invent_example_1(c)
  2101 $c_p := c \pmod p$ /* calculate remainder $c_p$ of c modulo p */
  2102 $c_q := c \pmod q$ /* calculate remainder $c_q$ of c modulo q */
  2103 $m_p := c_p^{d_p-s} \pmod p$ /* modular exponentiation modulo p with base $c_p$ and exponent $d_p - s$ */
  2104 $m_q := c_q^{d_q-s} \pmod q$ /* modular exponentiation modulo q with base $c_q$ and exponent $d_q - s$ */
  2105 m := ((u × ($m_q-m_p$)) $\pmod q$) × p + $m_p$ /* calculate $m_s := c^{d-s} \pmod n$) as a result of CRT composition */
  2106 for (j = 0; j < s; j++) m := m × c $\pmod n$) /* execute release of shifting by multiplying c by s times */
  2107 output m

FIG. 8

- input
  c: ciphertext
- output
  m: plaintext
- private key
  $d_p$: private key, satisfying $d_p = d \bmod (p - 1)$
  $d_q$: private key, satisfying $d_q = d \bmod (q - 1)$
  p: private key, first prime number
  q: private key, second prime number
  u: private key, $u = p^{-1} \pmod q$
- work area
  s: shift parameter for exponent (random number)

- Algorithm: m = CRT_DEC_Invent_example_2(c)
2200 s = random number
2201 $c_p := c \pmod p$ /* calculate remainder $c_p$ of c modulo p */
2202 $c_q := c \pmod q$ /* calculate remainder $c_q$ of c modulo q */
2203 $m_p := c_p^{d_p-s} \pmod p$ /* modular exponentiation modulo p with base $c_p$ and exponent $d_p - s$ */
2204 $m_q := c_q^{d_q-s} \pmod q$ /* modular exponentiation modulo q with base $c_q$ and exponent $d_q - s$ */
2205 $m := ((u \times (m_q - m_p)) \bmod q) \times p + m_p$ /* calculate $m_s := c^{d-s} \pmod n$ as a result of CRT composition */
2206 for (j = 0; j < s; j++) $m := m \times c \pmod n$ /* execute release of shifting by multiplying c by s times */
2207 output m

FIG. 9

- input
  c: ciphertext
- output
  m: plaintext
- private key
  $d_p$: private key, satisfying $d_p \equiv d \bmod (p - 1)$
  $d_q$: private key, satisfying $d_q \equiv d \bmod (q - 1)$
  p: private key, first prime number
  q: private key, second prime number
  u: private key, $u = p^{-1} \pmod q$
- parameter
  s: shift parameter for exponent (constant). s is a t-bit value
  W: work memory (of $\log_2 n$ bits)

- Algorithm: m = CRT_DEC_Invent_example_3(c)
2301 $c_p := c \pmod p$ /* calculate remainder $c_p$ of c modulo p */
2302 $c_q := c \pmod q$ /* calculate remainder $c_q$ of c modulo q */
2303 $m_p := c_p^{d_p - s} \pmod p$ /* modular exponentiation modulo p with base $c_p$ and exponent $d_p - s$ */
2304 $m_q := c_q^{d_q - s} \pmod q$ /* modular exponentiation modulo q with base $c_q$ and exponent $d_q - s$ */
2305 $m := ((u \times (m_q - m_p)) \pmod q) \times p + m_p$ /* calculate $m_s := c^{d-s} \pmod n$ as a result of CRT composition */
2306 W = 1;
2307 for (j = t-1; j >= 0; j--) {/* calculate $c^s \pmod n$ for work variable W by left-to-right binary method */
2308   W := $W^2 \pmod n$
2309   if (j-th bit value of s == 1) W: W x c(mod n)
2310 }
2311 m := m x W (mod n) /* multiply $c^s \pmod n$ for releasing shifting */
2312 output m

FIG. 10

- input
  - c: ciphertext
- output
  - m: plaintext
- private key
  - $d_p$: private key, satisfying $d_p = d \mod (p-1)$
  - $d_q$: private key, satisfying $d_q = d \mod (q-1)$
  - p: private key, first prime number
  - q: private key, second prime number
  - u: private key, $u = p^{-1} \pmod q$
- parameter
  - s: shift parameter for exponent (constant), s is a t-bit value
  - W: work memory (of $\log_2 n$ bits)

- Algorithm: m = CRT_DEC_Invent_example_4(c)
  2401 $c_p := c \pmod p$ /* calculate remainder $c_p$ of c modulo p */
  2402 $c_q := c \pmod q$ /* calculate remainder $c_q$ of c modulo q */
  2403 $m_p := c_p^{d_p-s} \pmod p$ /* modular exponentiation modulo p with base $c_p$ and exponent $d_p - s$ */
  2404 $m_q := c_q^{d_q-s} \pmod q$ /* modular exponentiation modulo q with base $c_q$ and exponent $d_q - s$ */
  2405 $m := ((u \times (m_q - m_p)) \pmod q) \times p + m_p$ /* calculate $m_s := c^{d-s} \pmod n$ as a result of CRT composition */
  2406 W = c;
  2407 for (j = 0; j < t; j++) {/* multiply m by $c^s \pmod n$ by right-to-left binary method */
  2408   if (j-th bit value of s == 1) m := m x W (mod n)
  2409   W := W x W (mod n)
  2410 }
  2411 output m

FIG. 11

```
・input
  c: ciphertext
・output
  m: plaintext
・private key
  d_p: private key, satisfying d_p = d mod (p - 1)
  d_q: private key, satisfying d_q = d mod (q - 1)
  p: private key, first prime number
  q: private key, second prime number
  u: private key, u = p^-1 (mod q)
・parameter
  s: shift parameter for exponent (random number), s is a t-bit value
  W: work memory (of log_2 n bits)

・Algorithm: m = CRT_DEC_Invent_example_5(c)
2500 s := (given as a t-bit random number)
2501 c_p := c (mod p)   /* calculate remainder c_p of c modulo p */
2502 c_q := c (mod q)   /* calculate remainder c_q of c modulo q */
2503 m_p := c_p^(dp-s) (mod p)  /* modular exponentiation modulo p with base c_p and exponent d_p - s */
2504 m_q := c_q^(dq-s) (mod q)  /* modular exponentiation modulo q with base c_q and exponent d_q - s */
2505 m := ((u × (m_q-m_p)) (mod q)) × p + m_p  /* calculate m_s := c^(d-s) (mod n) as a result of CRT composition */
2506 W := 1;
2507 for (j = t-1; j >= 0; j--) {/* calculate c^s (mod n) for work variable W by left-to-right binary method */
2508   W := W^2 (mod n)
2509   if (j-th bit value of s == 1) W := W × c (mod n)
2510 }
2511 m := m × W (mod n)   /* multiply c^s (mod n) for releasing shifting */
2512 output m
```

FIG. 12

- input
  c: ciphertext
- output
  m: plaintext
- private key
  $d_p$: private key, satisfying $d_p = d$ mod $(p - 1)$
  $d_q$: private key, satisfying $d_q = d$ mod $(q - 1)$
  p: private key, first prime number
  q: private key, second prime number
  u: private key, $u = p^{-1}$ (mod q)
- parameter
  s: shift parameter for exponent (random number), s is a t-bit value
  W: work memory (of $\log_2 n$ bits)

- Algorithm: m = CRT_DEC_Invent_example_6(c)
2600 s := (given as a t-bit random number)
2601 $c_p$ := c (mod p) /* calculate remainder $c_p$ of c modulo p */
2602 $c_q$ := c (mod q) /* calculate remainder $c_q$ of c modulo q */
2603 $m_p$ := $c_p^{d_p - s}$ (mod p) /* modular exponentiation modulo p with base $c_p$ and exponent $d_p - s$ */
2604 $m_q$ := $c_q^{d_q - s}$ (mod q) /* modular exponentiation modulo q with base $c_q$ and exponent $d_q - s$ */
2605 m := ((u × ($m_q - m_p$)) (mod q)) × p + $m_p$ /* calculate $m_s$ := $c^{d-s}$ (mod n) as a result of CRT composition */
2606 W = c;
2607 for (j=0; j<t; j++) [/* multiply m by $c^s$ (mod n) by right-to-left binary method */
2608 if (j-th bit value of s == 1) m := m × W (mod n)
2609 W := W × W (mod n)
2610 }
2611 output m

FIG. 13

- input
  e: public key
  n: composite number satisfying n = p × q, wherein p and q are prime numbers
  m: plaintext
- output
  c: ciphertext

- Algorithm: c = RSA_ENC(m)
101 c := $m^e$ (mod n) /* modular exponentiation modulo n with base m and exponent e */
102 output c

FIG. 14

- input
  n: composite number satisfying n = p × q
  c: ciphertext
- output
  m: plaintext
- private key
  d: private key, satisfying e × d ≡ 1 mod (p − 1)(q − 1)

- Algorithm: m := NonCRT_DEC(n, c)
201 m := c^d (mod n) /* modular exponentiation modulo n with base c and exponent d */
202 output m

FIG. 15

-input
c: ciphertext
-output
m: plaintext
- private key
  $d_p$: private key, satisfying $d_p = d \bmod (p - 1)$
  $d_q$: private key, satisfying $d_q = d \bmod (q - 1)$
  p: private key, first prime number
  q: private key, second prime number
  u: private key, $u = p^{-1} \pmod q$

- Algorithm: m = CRT_DEC(c)
301 $c_p := c \pmod p$  /* calculate remainder $c_p$ of c modulo p */
302 $c_q := c \pmod q$  /* calculate remainder $c_q$ of c modulo q */
303 $m_p := c_p^{d_p} \pmod p$  /* modular exponentiation modulo p with base $c_p$ and exponent $d_p$ */
304 $m_q := c_q^{d_q} \pmod q$  /* modular exponentiation modulo q with base $c_q$ and exponent $d_q$ */
305 $m := ((u (m_q - m_p)) \pmod q) \times p + m_p$
    /* calculate modular exponent modulo n from modular exponent modulo p and q (CRT composition) */
306 output m

FIG. 16

- input
  $\alpha$ : bit length of p
  $\varepsilon$ : error in determining magnitude of p in power analysis
  $\pi$ : estimated error of p, $\pi$
- output
  candidate values of p {$p_{min}$, $p_{min+1}$, ..., $p_{max}$}

- Algorithm
  401 $p_{min} := 0$; $p_{max} := 2^{\alpha}$;
  402 while ($p_{max} - p_{min} \leq \pi$) do { /* $\pi$ is a constant corresponding to error range of p */
  403 $p_{mid} := (p_{min} + p_{max})/2$;
  404 determine whether or not $p_{mid} + \varepsilon < p$ through attack using power consumption in decryption with CRT
  405 if ($p_{mid} + \varepsilon < p$) then $p_{min} := p_{mid}$;
  406 else $p_{max} := p_{mid}$;
  407 }
  408 $p_{max} := p_{max} + \varepsilon$;
  409 output {$p_{min}$, $p_{min+1}$, ..., $p_{max}$} as candidate values of p

FIG. 17

- input
  d: exponent (private key in RSA decryption)
  c: base
  n: modulus
  u: most significant bit of d
- output
  m = $c^d$ (mod n)

/* make k-bit window w[x] = $c^x$ (mod n) for 0 < x < $2^k$ */
w[0] = 1; /* w[0] = $c^0$ (mod n) = 1 */
for (i = 1; i < $2^k$; i++) w[i] = c × w[i-1] (mod n); /* w[i] = c × $c^{i-1}$ (mod n) */ m = 1;
for (i = [u/k]1; i >= 0; i = i-1) {
  /* take i-th k-bit block of exponent d as $b_i$ */
  $b_i$ = ($d_{ik+k-1}$, ..., $d_{ik+1}$, $d_{ik}$)$_2$
  m := m × w[$b_i$] (mod n);
  /* calculate $2^k$ multiplication of m := $m^{2^k}$ by multiplying m by 2 by k times */
  if (i > 0) for (j = 0; j < k; j++) m := m × m (mod n);
}
return m;

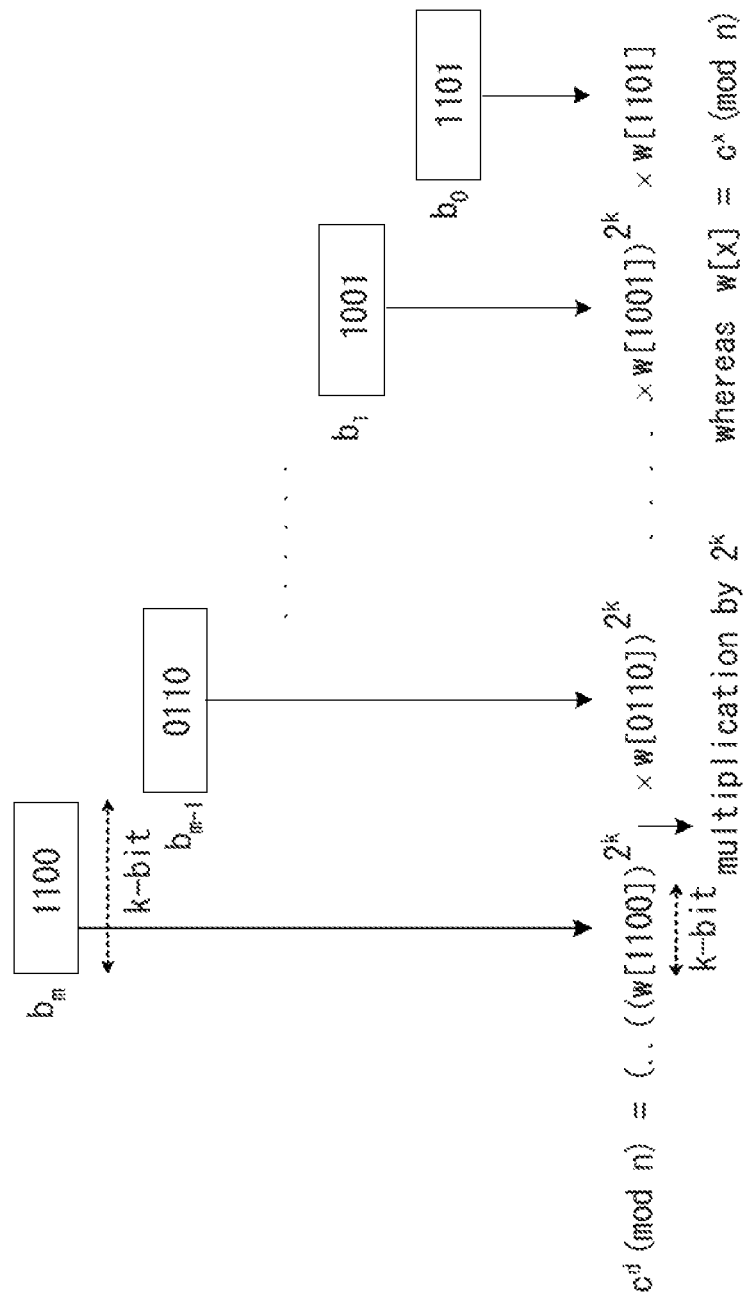

FIG. 20

1001  N $a_i$ ($x \leq a_i < x + \varepsilon$) are given to an encryption device as a base, so as to cause processing of CRT(ai) of FIG. 15 to be performed. In the processing of FIG. 15, power consumption data P(ai, time) of the device in executing ai (mod p) (as at step 301 or the like) is measured with respect to all values of i.

1002  With the entire set of the power consumption data P(ai, time) indicated by G, the set G is divided into the following sets $G_{1j}$ and $G_{0j}$ in accordance with the j-th bit value from the least significant bit of ai with respect to all the values of j = 0, 1, $\cdots$, $\log_2 \varepsilon - 1$:
 - $G_{1j}$ = {P($a_j$, time)|j-th bit of $a_i$ = 1}
 - $G_{0j}$ = {P($a_j$, time)|j-th bit of $a_i$ = 0}

1003  A power difference curve $\Delta_j$ expressed as $\Delta_j$ = (average power of $G_{1j}$) - (average power of $G_{0j}$) is created on the basis of the sets $G_{1j}$ and $G_{0j}$.

1004  As a result, when a spike as illustrated in FIG.19(B) appears on all the curves with j = 0, 1, $\cdots$, $\log_2 \varepsilon - 1$ and the spike has a sufficient height, it is determined that $x + \varepsilon < p$.

FIG. 21

- input
  c: ciphertext
- output
  m: plaintext
- private key
  $d_p$: private key, satisfying $d_p = d \bmod (p - 1)$
  $d_q$: private key, satisfying $d_q = d \bmod (q - 1)$
  p: private key, first prime number
  q: private key, second prime number
  u: private key, $u = p^{-1} \pmod q$
- private parameters (constants precedently calculated)
  R: constant satisfying $R > p$ and $R > q$
  $R_p$: constant satisfying $R_p = R^{-dp} \pmod p$
  $R_q$: constant satisfying $R_q = R^{-dq} \pmod q$ -Algorithm: m = CRT_DEC(c)
1101 $c'_p := c \times R \pmod p$   /* calculate remainder $c_p$ of R-fold c modulo p */
1102 $c'_q := c \times R \pmod q$   /* calculate remainder $c_q$ of R-fold c modulo q */
1103 $m'_p := c'_p{}^{dp} \pmod p$  /* modular exponentiation modulo p with base $c'_p$ and exponent $d_p$ $(= (c \times R)^{dp} \pmod p)$ */
1104 $m'_q := c'_q{}^{dq} \pmod q$  /* modular exponentiation modulo q with base $c'_q$ and exponent $d_q$ $(= (c \times R)^{dq} \pmod q)$ */
1105 $m_p := m'_p \times R_p \pmod p$  /* restore to $m_p = c^{dp} \pmod p$ by multiplying $R'_p$ */
1106 $m_q := m'_q \times R_q \pmod q$  /* restore to $m_q = c^{dq} \pmod q$ by multiplying $R'_q$ */
1107 $m := ((u(m_q - m_p) \pmod q) \times p + m_p$  /* calculate modular exponentiation modulo n from modular exponentiation modulo p and q (CRT composition) */
1108 output m

FIG. 22

- input
  n: composite number satisfying $n = p \times q$
  c: ciphertext
- output
  m: plaintext
- private key
  d: private key, satisfying $e \times d = 1 \mod (p-1)(q-1)$
  $\varphi(n)$: order against modulus n, when $n = p \times q$, $\varphi(n) = (p-1) \times (q-1)$

- Algorithm: m = NonCRT_DEC(n, c)
  1201 r := (given as a 20-bit random number)
  1202 m := $c^{d+r\times\varphi(n)}$ (mod n) /* modular exponentiation modulo n with base c and exponent $d + r \times \varphi(n)$ */
  1203 output m

DECRYPTION PROCESSOR AND DECRYPTION PROCESSING METHOD

CROSS-REFERENCE TO RELATED APPLICATION

This application is based upon and claims the benefit of priority of the prior Japanese Patent Application No. 2009-8464, filed on Jan. 19, 2009, the entire contents of which are incorporated herein by reference.

FIELD

Embodiments discussed herein are related to a decryption processor and a decryption processing method.

BACKGROUND

The cryptosystem is roughly divided into a common key cryptosystem and a public key cryptosystem. In the system designated as the common key cryptosystem, the same key (secret key) is used for encryption and decryption, and the security is retained by keeping the secret key as information unknown to a third party other than a transmitter and a receiver. In the public key cryptosystem, different keys are used for encryption and decryption, and the security is retained by keeping a key (private key) used for decryption of a ciphertext as secret information of a receiver alone while a key (public key) used for encryption is open to the public.

One of techniques of the field of cryptography is decryption technique. The decryption technique is a technique of guessing secret information such as a secret key on the basis of available information such as a ciphertext, and there are various methods for the decryption technique. One method in the spotlight recently is designated as power analysis attack (hereinafter referred to as "PA"). The PA is a method developed by Paul Kocher in 1998, in which power consumption data obtained by providing various input data to an encryption device included in a smartcard or the like is collected and analyzed so as to guess key information stored in the encryption device. It is known that a secret key of both the common key cryptosystem and the public key cryptosystem may be guessed from an encryption device by employing the PA.

There are two kinds of PA, that is, single power analysis (hereinafter referred to as "SPA") and differential power analysis (hereinafter referred to as "DPA"). The SPA is a method for guessing a secret key on the basis of the feature of single power consumption data of an encryption device, and the DPA is a method for guessing a secret key by analyzing differences among a large number of pieces of power consumption data.

At this point, an RSA cryptosystem will be described. The RSA cryptosystem security is based on difficulty of prime factorization. Although it is easy to calculate a composite number $n=p \times q$ on the basis of two prime numbers p and q of 1024 bits each, it is difficult to obtain the prime factors p and q on the basis of the composite number n alone (i.e., prime factorization is difficult), which is the premise of the security of the RSA cryptosystem. The RSA cryptosystem has two functions of encryption and decryption. Two kinds of decryptions are known: one is decryption not using Chinese remainder theorem (hereinafter referred to as "CRT") (i.e., decryption without the CRT) and the other is decryption using the CRT (i.e., decryption with the CRT). The encryption, the decryption without the CRT and the decryption with the CRT are respectively illustrated in FIGS. 13, 14 and 15.

The encryption process and the decryption process without the CRT respectively illustrated in FIGS. 13 and 14 are very simple. In the encryption process, a ciphertext c is output through modular exponentiation of $c := m^e \pmod{n}$ modulo a composite number n wherein the base is a plaintext m and the exponent is a public key e. In the decryption without the CRT, a plaintext m is output through modular exponentiation of $m := c^d \pmod{n}$ modulo a composite number n wherein the base is a ciphertext c and the exponent is a private key d. Incidentally, the private key d has a value satisfying a relationship with the public key e of $e \times d = 1 (\mod(p-1)(q-1))$. With respect to the calculation of modular exponentiation, a plurality of calculation algorithms are known including a binary method and a window method, and resistance to the SPA or the DPA depends upon the algorithm to be employed. The decryption with the CRT is a rapid version algorithm attained by reducing the amount of computation of the decryption without the CRT. In general, the amount of computation of the modular exponentiation is in proportion to (bit length of exponent)×(bit length of modulus)×(bit length of modulus). For example, with respect to the RSA cryptosystem wherein each of prime factors p and q is a 1024-bit value and a composite number n is a 2048-bit value, the bit length of the private key d is 2048 bits. This is because $e \times d = 1 (\mod(p-1)(q-1))$, namely, $d = e^{-1} (\mod p-1)(q-1))$, and the private key d has a value satisfying $0 < d < (p-1) \times (q-1)$, and therefore, the bit length of the private key d is equal to $(p-1)(q-1)$, namely, 2048 bits. In this case, the necessary amount of computation of the modular exponentiation is $2048 \times 2048 \times 2048 = 8589934592$. In general, the bit length of an exponent is substantially the same as the bit length of a modulus in the RSA decryption without the CRT. In other words, the amount of computation of the RSA decryption without the CRT is in proportion to the third power of the bit length of a modulus.

On the contrary, the decryption with the CRT illustrated in FIG. 15 is known to have the amount of computation reduced to ¼ of that of the decryption without the CRT. The decryption with the CRT includes the following three stages of CRT-1, CRT-2 and CRT-3:

CRT-1: Modular of a ciphertext c modulo p or q (steps 301 and 302 of FIG. 15)

CRT-2: Modular exponentiation modulo p or q (steps 303 and 304 of FIG. 15)

CRT-3: Calculation of a result of modular exponentiation modulo n based on the result of the modular exponentiation modulo p and q (CRT composition) (step 305 of FIG. 15)

The most part (95% or more) of the decryption with the CRT corresponds to the modular exponentiation of the stage CRT-2, which is modular exponentiation modulo a prime number p or q wherein a base is $c_p = c (\mod p)$ or $c_q = c (\mod q)$ and an exponent is a private key $d_p = d(\mod(p-1))$ or $d_q = d(\mod(q-1))$. The bit length of the modulus p or q is a half of that of the composite number n, namely, 1024 bits, and the bit length of the exponent $d_p$ or $d_q$ is also a half of that of the private key d, namely, 1024 bits. Accordingly, the amount of computation of the modular exponentiation to be performed at step 303 or 304 is $1024 \times 1024 \times 1024 = 1073741824$, which is ⅛ of the amount of computation of the modular exponentiation for the bit length of 2048 bits. Since the processing with the ⅛ amount of computation is repeated twice, the amount of computation of the decryption with the CRT is $⅛ \times 2 = ¼$ of the amount of computation attained without the CRT.

When the decryption with the CRT is employed, the amount of computation one fourth of that attained by the decryption without the CRT, namely, an operation speed four times as high as that attained by the decryption without the CRT, may be realized. On the other hand, the decryption with the CRT has a disadvantage that it includes a large number of operations using the prime number p or q as illustrated in FIG. 15. Since the security of the RSA cryptosystem is based on the difficulty of the prime factorization of n=p×q, the RSA cryptosystem loses the security if the value of the prime number p or q is revealed to an attacker. Since the power consumption tends to be correlated with the prime number p or q in such operation processing using the prime number p or q, there is a problem that the prime number p or q is easily revealed through the PA.

The PA is known as means for an attacker to attack an encryption device implementing the decryption without the CRT of FIG. 14 or the decryption with the CRT of FIG. 15, that is, processing using a private key, for obtaining a private key d, $d_p$, $d_q$, p, or q. Now, conventionally known SPA or DPA attack against the decryption of FIG. 14 or 15 will be described.

(Power Analysis Attack)
(Outline of SPA)

At this point, the outline of the SPA will be described. The SPA is an attack made for guessing a private key used in an encryption device by using information obtained through observation of a single power waveform. This is an effective attack against an encryption device in which there is correlation between the content of the encryption and the shape of a power consumption waveform.

(Power Analysis Attack 1 using SPA (targeting decryption with CRT): Attack 1)

Now, power analysis attack using the SPA targeting the decryption with the CRT (hereinafter referred to as the attack 1) will be described.

SPA attack targeting the decryption with the CRT illustrated in FIG. 15 is disclosed in Japanese Patent No. 4086503. The disclosed attack targets the remainder processing with the prime number p or q performed at step 301 or 302. It depends upon the implementation form of the remainder processing of step 301 or 302 whether or not the attack succeeds. In the implementation form for succeeding, when Z=X mod Y is to be calculated, X and Y are compared with each other, and when X<Y, Y is output as a remainder result Z, and merely when X≧Y, a modular exponentiation Z=X (mod Y) is calculated to be output as described below. As the premise for holding the attack disclosed by Patent No. 4086503, an encryption device should perform the decryption with the CRT by employing this implementation. Specifically, the following processing is performed in the operation of Z=X (mod Y) in this method:

if (X<Y) then output X as Y
if (X≧Y) then calculate Z=X (mod Y) and output Z
(this processing is hereinafter designated as "processing MOD_ALG").

In the processing MOD_ALG, the input X and the modulus Y are compared with each other, and the modular exponentiation is not executed when X<Y, and the modular exponentiation is executed merely when X≧Y. In other words, it is determined whether or not the modular exponentiation is to be executed in accordance with the relationship in magnitude between X and Y. If the attacker can observe the execution of the modular exponentiation by using power consumption, the relationship in magnitude between X and Y, that is, internal data of the encryption device, may be known in accordance with the power consumption. When this property is applied to step 301 or 302 of FIG. 15, the attacker can decrypt the prime number p or q. At step 301 or 302, the remainder processing with the prime number p or q is performed on the input ciphertext c. It is noted that in the implementation in an encryption device such as a smartcard, although the private key ($d_p$, $d_q$, p, q or u) is a value that is held within the device and cannot be externally input, the ciphertext c is a value that may be externally input by a third party. In other words, the attacker can determine whether c<p or c≧p with respect to the controllable ciphertext c by observing the power consumption in the remainder processing of step 301 or 302. When such determination is made, the prime number p can be easily obtained by using dichotomizing search illustrated in FIG. 16.

FIG. 16 illustrates an algorithm for narrowing candidate values for the prime number p by repeatedly halving a difference between the maximum value and the minimum value of p−ϵ with the minimum value of p−ϵ held as $p_{min}$ and the maximum value of p−ϵ held as $p_{max}$.

In the above, ϵ is a parameter corresponding to the maximum value of a decision error occurring in the power analysis and ϵ≧0. The magnitude of the parameter ϵ depends upon the attacking method to be employed. The parameter ϵ changes in accordance with means for determining at step 404 whether or not $p_{mid}$+ϵ<p. As the means for this determination, when it is determined whether $p_{mid}$<p or $p_{mid}$≧p by executing the SPA against the decryption with the CRT with CRT_DEC ($p_{mid}$) input, ϵ=0. When the DPA described below is employed, the parameter ϵ is approximately 1000 times as large as that used in the SPA.

As illustrated at step 401, $p_{min}$ is initialized to an initial value of 0 and $p_{max}$ is initialized to an initial value of 2α (wherein α is the bit length of the prime number p). Thereafter, in a loop of steps 402 through 407, processing for narrowing the range of the prime number p by halving a difference between $p_{min}$ and $p_{max}$ is performed. This narrowing processing is performed by calculating a median value $p_{mid}$ of $p_{max}$ and $p_{min}$ and determining the relationship in magnitude between $p_{mid}$ and p through the attack using the power consumption.

As illustrated at step 403, the median value $p_{mid}$ of $p_{max}$ and $p_{min}$ is given as $p_{mid}$=($p_{max}$+$p_{min}$)/2. It is determined whether or not $p_{mid}$+ϵ<p with respect to the thus given value $p_{mid}$ by the attack using the power consumption.

When $p_{mid}$+ϵ<p is true, it means that $p_{mid}$<p−ϵ<$p_{max}$. Therefore, while keeping $p_{max}$ as the maximum value, $p_{mid}$ is set as a new minimum value of p−ϵ, and hence, processing of $p_{min}$:=$p_{mid}$ is performed at step 405.

When $p_{mid}$+ϵ<p is false, it means that $p_{min}$≧p−ϵ. Therefore, while keeping $p_{min}$ as the minimum value, $p_{mid}$ is set as a new maximum value of p−ϵ, and hence, processing of $p_{max}$:=$p_{mid}$ is performed at step 405 (whereas the symbol ":=" means that the result of the right side is substituted in the left side).

By repeating the above-described processing, the processing for halving a difference between the maximum value $p_{max}$ and the minimum value $p_{min}$ of the prime number p is repeated, and when the difference is as small as $p_{max}$−$p_{min}$≦π as illustrated at step 402, it is determined that the range of the prime number p has been sufficiently narrowed, and candidate values of the prime number p are output.

At step 408, processing for determining the maximum value and the minimum value of the prime number p on the basis of the range of p−ϵ sufficiently narrowed (to a difference not more than π) is performed. In the case where $p_{min}$≦p−ϵ≦$p_{max}$ when ϵ≧0, the minimum value of the prime number p is $p_{min}$ and the maximum value is $p_{max}$+ϵ, and therefore, the processing of $p_{max}$:=$p_{max}$+ϵ is executed with respect to the maximum value $p_{max}$ of the prime number p. As a result of the processing, $p_{max}$−$p_{min}$≦π+ϵ.

At step 409, $[p_{min}, p_{min}+1, \ldots, p_{max}]$ are output as the candidate values of the prime number p and the processing is terminated. Since the number of candidate values of the prime number p is halved every time the loop of steps 403 through 407 is executed, the repeat of the loop is terminated in calculation time in proportion to $\alpha$. For example, when the prime number p has a bit length of 1024 bits, the number of repeating the loop is 1024 at most, and thus, the prime number p can be very efficiently obtained.

(Outline of DPA)

Next, the DPA will be described. The DPA is an attack for guessing a private key used in an encryption device by observing a plurality of power waveforms and obtaining differences among the plural power waveforms. The DPA is effective in an environment where there is correlation between data read/written in an encryption device and power consumed in the read/write. It is known in general that power consumption has a property to be increased in proportion to the number of one's (1's) of binary data included in data read/written in an encryption device. In the DPA, this property is used for obtaining a private key.

(Power Analysis Attack 1 using DPA (targeting decryption without CRT): Attack 2)

Now, the power analysis attack by using the DPA targeting the decryption without the CRT (hereinafter designated as the attack 2) will be described. Among attacks using the DPA against the RSA cryptosystem, the most popularly known method is an attack for obtaining an exponent d by measuring power consumption in executing modular exponentiation of $c^d \pmod n$. This attack is effective against the decryption without the CRT illustrated in FIG. 14. When such a private key is revealed to an attacker, an arbitrary ciphertext can be decrypted, and hence, the security of the RSA cryptosystem cannot be retained. In other words, the private key d is a significant property to be protected from the attack by the SPA or the DPA similarly to the prime numbers p and q.

In order to make this attack succeed, the attacker is required to know the processing method of the modular exponentiation algorithm executed within the encryption device. The types of processing methods of modular exponentiation algorithm are basically roughly divided into the binary method and the window method and the types are very limited, and therefore, even when all attacking methods imaginable with respect to each of the types of the modular exponentiation algorithm are tried, it is merely several times as many efforts for the attacker, and hence, this requirement does not cause a serious problem for the attacker.

Assuming that the modular exponentiation algorithm implemented in an encryption device is the window method and that an attacker knows it, the attacking method for obtaining an exponent d on the basis of the power consumption in the modular exponentiation of $c^d \pmod n$ will be described. Although the window method is exemplarily employed in the following description, the DPA is effective against another modular exponentiation algorithm such as the binary method.

At this point, an operation by the window method and the DPA attack against the window method will be described. The modular exponentiation is a process for calculating v satisfying a relationship of $m = c^d \pmod n$ among an exponent d, a base c and a modulus n. As an algorithm for efficiently performing this process, the window method is known. Assuming that the binary expression of the exponent d is expressed as $d = (d_{u-1}, d_{u-2}, \ldots, d_0)_2$, FIG. 17 illustrates an algorithm of the modular exponentiation for calculating $m = c^d \pmod n$ by the window method. The outline of the operation performed in FIG. 17 is illustrated in FIG. 18.

The operation of FIG. 17 will now be described. First, processing of creating a table w satisfying a relationship of $w[x] = c^x \pmod n$ is performed for $0 < x < 2^k$. After creating the table, u/k sequences $b_i$ ($i = 0, 1, \ldots$) are created as block values obtained by dividing $d = (d_{u-1}, d_{u-2}, \ldots, d_0)_2$ of u bits by every k bits, namely, blocks $b_i = (d_{ik+k-1}, \ldots, d_{ik})_2$. Table indexing processing by using each block $b_i$ ($m := m \times w[b_i]$) and $2^k$ multiplication of $m := m^{2^k} \pmod n$ are repeated for calculating $m = c^d \pmod n$.

Now, a method in which an attacker guesses an exponent d used within an encryption device employing the window method by using the DPA will be described. In the RSA cryptosystem, the exponent d is a private key and is a significant property to be protected from an attacker. Since the exponent d generally has a value of 1024 or more bits, if the value is to be obtained by brute force approach, it takes $2^{1024}$ efforts and hence is impossible. In the DPA, however, attention is paid to the processing of the window method for dividing the exponent d by every k bits. For example, in the processing illustrated in FIG. 18, the exponent d is divided into blocks $b_i$ by every 4 bits, and intermediate data of each block $b_i$, that is, $m := m \times w[b_i] \pmod n$, is calculated. Since the value of $m := m \times w[b_i]$ is read/written as internal data of an encryption device, the attacker can obtain information of the block $b_i$ by measuring power consumption in reading/writing the calculation result m of $m := m \times w[b_i]$. The block $b_i$ is data as small as k bits (which is 4 bits in the exemplary case of FIG. 18), and therefore, when the brute force approach to the k-bit value $b_i$ is repeated with respect to all the bit values of the exponent d, the attacker can efficiently obtain the value of the exponent d. For example, when k=2 and d is a 2048-bit value, the exponent d is divided into 1024 2-bit blocks $b_i$, and there is no need for the attacker to execute the brute force approach to all the bit values of 2048 bits but merely 2 bits, namely, four, kinds of brute force approaches are repeated 1024 times, and the number of necessary efforts is $4 \times 1024 = 4096$ alone, and thus, the value of the exponent d can be efficiently obtained.

In the brute force approach with respect to every k bits, it is necessary for the attacker to select a correct value out of $2^k b_i$ candidate values by the DPA, and the method for selecting a correct value will now be described.

For example, when k=2 and $d = (d_5, d_4, d_3, d_2, d_1, d_0)_2$, divided blocks are $b_2 = (d_5, d_4)_2$, $b_1 = (d_3 d_2)_2$ and $b_0 = (d_1 d_0)_2$, and in the modular exponentiation by the window method illustrated in FIG. 17, $m = c^d \pmod n$ is calculated through the following processing 1 through processing 5:

| | |
|---|---|
| $m = 1 \times w[b_2] \pmod n = c^{b2} \pmod n$ | Processing 1 |
| $m = (w[b_2])^4 \pmod n = c^{4b2} \pmod n$ | Processing 2 |
| $m = ((w[b_2])^4) \times w[b_1] \pmod n = c^{4b2} c^{b1} \pmod n$ | Processing 3 |
| $m = (((w[b_2])^4) \times w[b_1])^4 \pmod n = c^{16b2} c^{4b1} \pmod n$ | Processing 4 |
| $m = (((w[b_2])^4) \times w[b_1])^4 \times w[b_0] \pmod n = c^{16b2} c^{4b1} c^{b0} \pmod n = c^d \pmod n$ | Processing 5 |

If the attacker knows that the encryption device implements the window method, the attacker also knows that the aforementioned processing 1 through 5 are performed in the encryption device. Therefore, values of $b_2$, $b_1$ and $b_0$, that is, candidate values of $b_i$, are guessed through the DPA performed as follows, so as to guess the value of the exponent d:

501: The encryption device is provided with N values $a_i$ (wherein i is 1, 2, ... and N) as bases so as to cause it to calculate $a_i^d \pmod n$. Data of power consumed in the device at this point, i.e., power consumption data $P(a_i, \text{time})$, is measured with respect to each value of i.

502: A 2-bit value $b_2$ is predicted as a value $b'_2$, and the following procedures (1) and (2) are repeated until it is determined that $b_2 = b'_2$:

(1) With attention paid to intermediate data v of the processing 1, a value of $m = a_i^{b'2}(\text{mod } n)$ is simulated on the basis of the predicted value $b'_2$, and the data $P(a_i, \text{time})$ (wherein i=1, 2, ... and N) is classified into two sets $G_1$ and $G_0$.

$G_1 = [P(a_i, \text{time}) | \text{least significant bit of } a_i^{b'2}(\text{mod } n) = 1]$ $G_0 = [P(a_i, \text{time}) | \text{least significant bit of } a_i^{b'2}(\text{mod } n) = 0]$ (2) A power difference curve $\Delta$ expressed as $\Delta = $ (average power of $G_1$) − (average power of $G_0$) is created on the basis of the sets $G_1$ and $G_0$. As a result, for example, in a time-power curve as illustrated in FIG. 19(A), when a spike as illustrated in FIG. 19(B) appears, it is determined that $b_2 = b'_2$ (namely, $b_2$ is successfully guessed), and when a substantially even curve as illustrated in FIG. 19(C) is obtained, it is determined that $b_2 \neq b'_2$.

503: A 2-bit value $b_1$ is predicted as a value $b'_1$, and the following procedures (1) and (2) are repeated until it is determined that $b_1 = b'_1$:

(1) With attention paid to intermediate data v of the processing 3, a value of $m = a_i^{4b2} a_i^{b'1}(\text{mod } n)$ is simulated on the basis of the previously guessed value $b_2$ and the predicted value $b'_1$, and the data $P(a_i, \text{time})$ (wherein i=1, 2, ... and N) is classified into two sets $G_1$ and $G_0$.

$G_1 = [P(a_i, \text{time}) | \text{least significant bit of } a_i^{4b2} a_i^{b'1}(\text{mod } n) = 1]$ $G_0 = [P(a_i, \text{time}) | \text{least significant bit of } a_i^{4b2} a_i^{b'1}(\text{mod } n) = 0]$ (2) A power difference curve $\Delta$ expressed as $\Delta = $ (average power of $G_1$) − (average power of $G_0$) is created on the basis of the sets $G_1$ and $G_0$. As a result, when a spike as illustrated in FIG. 19(B) appears, it is determined that $b_1 = b'_1$ (namely, $b_1$ is successfully guessed), and when a substantially even curve as illustrated in FIG. 19(C) is obtained, it is determined that $b_1 \neq b'_1$.

504: A 2-bit value $b_0$ is predicted as a value $b'_0$, and the following procedures (1) and (2) are repeated until it is determined that $b_0 = b'_0$:

(1) With attention paid to intermediate data v of the processing 5, and a value of $m = a_i^{16b2} a_i^{4b1} a_i^{b'0}(\text{mod } n)$ is simulated on the basis of the previously guessed values $b_2$ and $b_1$ and the predicted value $b'_0$, and the data $P(a_i, \text{time})$ (wherein i=1, 2, ... and N) is classified into two sets $G_1$ and $G_0$.

$G_1 = [P(a_i, \text{time}) | \text{least significant bit of } a_i^{16b2} a_i^{4b1} a_i^{b'0} (\text{mod } n) = 1]$ $G_0 = [P(a_i, \text{time}) | \text{least significant bit of } a_i^{16b2} a_i^{4b1} a_i^{b'0} (\text{mod } n) = 0]$ (2) A power difference curve $\Delta$ expressed as $\Delta = $ (average power of $G_1$) − (average power of $G_0$) is created on the basis of the sets $G_1$ and $G_0$. As a result, when a spike as illustrated in FIG. 19(B) appears, it is determined that $b_0 = b'_0$ (namely, $b_0$ is successfully guessed), and when a substantially even curve as illustrated in FIG. 19(C) is obtained, it is determined that $b_0 \neq b'_0$.

When $b_i$ is correctly predicted, the value of m simulated by the attacker is generated also in the encryption device to be read/written, and therefore, since a differential power waveform in which the numbers of zero's (0's) and one's (1's) included in the value m are extremely biased between the sets $G_1$ and $G_0$ as in the aforementioned sets $G_1$ and $G_0$ is created, there arises a difference in the power consumption, and this difference in the power consumption is observed as a spike waveform as illustrated in FIG. 19(B).

When $b_i$ is incorrectly predicted, the value of m simulated by the attacker is not generated in the encryption device, and a value completely different from the simulated value is read/written, and therefore, even when a differential power waveform in which the numbers of zero's (0's) and one's (1's) included in the value m are extremely biased between the sets $G_1$ and $G_0$ as in the aforementioned sets $G_1$ and $G_0$ is created, a spike waveform cannot be obtained. When the prediction of $b_i$ is incorrect, the sets $G_1$ and $G_0$ are sets obtained by randomly classifying the whole set G of the data $P(a_i, \text{time})$ (wherein i=1, 2, ..., N) into two groups, and therefore, the average power consumption is substantially equivalent between the sets $G_1$ and $G_0$, resulting in a substantially even differential waveform as illustrated in FIG. 19(C).

(Power Analysis Attack 2 using DPA (targeting decryption with CRT): Attack 3)

Next, power analysis attack using the DPA targeting the decryption with the CRT (hereinafter designated as the attack 3) will be described. The attack using the SPA against the stage CRT-1 of the decryption with the CRT, namely, the modular exponentiation of a ciphertext (base) c using prime numbers p and q, has been already described. The DPA is also applicable to this processing. In the attack using the SPA, with respect to the base c controlled by an attacker and input to the encryption device, it is determined whether $c \geq p$ or $c < p$ by using a single power consumption waveform. On the contrary, in the attack using the DPA, with respect to a base c input to the encryption device, it is determined whether or not $c + \epsilon < p$ by using a difference among a plurality of power consumption waveforms, whereas $\epsilon$ is an error parameter. When it is successfully determined that $c + \epsilon < p$, candidate values of the prime number p can be narrowed by using the dichotomizing search illustrated in FIG. 16. Even when the search as illustrated in FIG. 16 is employed, however, the number of candidate values of the prime number p cannot be reduced to $\epsilon + \pi$ or smaller. When the number of candidate values of the prime number p is sufficiently small (of, for example, $\epsilon + \pi < 2^{40}$) for the brute force approach, however, the value $\epsilon + \pi$ does not cause a serious problem for narrowing the value of the prime number p.

The SPA attack against the stage CRT-1 described above is carried out on the assumption that the modular exponentiation algorithm represented by $Z = X (\text{mod } Y)$ is performed in accordance with the processing MOD_ALG, namely, that the algorithm for switching the processing in accordance with the relationship in magnitude between X and Y is implemented, and on the other hand, the DPA attack described below is effective against an encryption device always executing the operation $Z = X (\text{mod } Y)$ regardless of the relationship in magnitude between X and Y.

FIG. 20 illustrates an algorithm for determining, with respect to a parameter x controllable by an attacker, whether or not $x + \epsilon < p$ by using the DPA. Differently from the attack using the SPA, this determination is made not for obtaining accurate decision but for determining whether or not $x + \epsilon < p$ with respect to the error parameter $\epsilon$. When the error parameter $\epsilon$ is too small, there is a possibility that accurate determination cannot be made depending upon the power consumption characteristic of the encryption device. This is because of the difference between the SPA where the determination is made by using a single power waveform and the DPA where the determination is made by using differences among a plurality of waveforms, and the error parameter $\epsilon$ is in proportion to the number of waveforms necessary for successfully performing the DPA. It is known in general that the DPA is successfully carried out by using differences among approximately 1000 pieces of data, and therefore, the error parameter $\epsilon$ has a value also as small as approximately 1000.

The principle for successfully performing the attack algorithm illustrated in FIG. 20 will be described. The result of the modular exponentiation represented by Z=X (mod Y) is always Z=X regardless of the implemented algorithm of the modular exponentiation when X<Y. Specifically, the value Z, that is, the output result Z to be read or written in the encryption device, is X (i.e., Z=X) when X<Y. In the above described sets $G_1$ and $G_0$, with respect to all bases $a_i$ represented as $x \leq a_i < x+\epsilon$, when $a_i < p$, namely, when $x+\epsilon < p$, a value calculated as $a_i$(mod p) is always $a_i$, and this value is read/written in a memory within the encryption device. The numbers of zero's (0's) and one's (1's) included in the sets $G_{1,j}$ and $G_{0,j}$ as all the operation results of $a_i$(mod p) are greatly biased with respect to all difference curves with j=0, 1, . . . and $\log_2 \epsilon -1$, and therefore, a spike as illustrated in FIG. 19(B) appears on power difference curves obtained as $G_{1,j}$–$G_{0,j}$ with respect to all values of j. On the contrary, when $a_i \geq p$ with respect to all bases $a_i$ represented as $a_i$=x, x+1, . . . , x+$\epsilon$, namely, when $x \geq p$, the operation result of $a_i$(mod p) is always $a_i - \lambda_i p$ wherein $\lambda_i$ is an integer. When the error parameter $\epsilon$ is sufficiently smaller than the prime number p, the integer $\lambda_i$ is highly likely to be a constant $\lambda$ regardless of the value of i, and therefore, the operation result of $a_i$(mod p) is $a_i - \lambda_i p$. The value of $a_i$ and the 0th, 1st, . . . , or $\log_2 \epsilon -1$th bit value from the least significant bit of $a_i - \lambda p$ are the same or different depending upon the influence of the propagation of carry through subtraction of $\lambda p$. Specifically, the 0th, 1st, . . . , or $\log_2 \epsilon -1$th bit value from the least significant bit of $a_i - \lambda p$ is not always the same as the 0th, 1st, . . . , or $\log_2 \epsilon -1$th bit value from the least significant bit of $a_i$ and is varied depending upon the values of $a_i$ and $\lambda p$. In other words, a spike does not always appear on all the power difference curves obtained as $G_{1,j}$–$G_{0,j}$, but no spike appears or merely a spike with a small height appears depending upon the value of j, and a sufficiently high spike cannot be obtained with respect to all the values of j.

The same is true when, with respect to all bases $a_i$ represented as $a_i$=x, x+1, . . . , x+$\epsilon$, some $a_i$ satisfy $a_i \geq p$ and the other $a_i$ satisfy $a_i < p$, and also in this case, a spike does not appear with respect to all the values of j.

Accordingly, when a sufficiently high spike as illustrated in FIG. 19(B) appears on a power difference curve obtained as $G_{1,j}$–$G_{0,j}$, it can be determined that $x+\epsilon < p$.

(Countermeasure against Power Analysis Attack)

Against the RSA cryptosystems illustrated in FIGS. 14 and 15, the attacking methods by the SPA or the DPA described as the attack 1, the attack 2 and the attack 3 above are known. Also, countermeasures against these attacks are known. Now, conventionally known two types of countermeasures (i.e., a countermeasure 1 and a countermeasure 2) against the attacks 1, 2 and 3 will be described.

(Countermeasure 1)

The countermeasure 1 is illustrated in FIG. 21. In FIG. 21, steps 1101 and 1102 correspond to the stage CRT-1, steps 1103, 1104, 1105 and 1106 correspond to the stage CRT-2, and steps 1107 and 1108 correspond to the stage CRT-3.

Constants R, $R_p$ and $R_q$ used in FIG. 21 are constants stored in an encryption device and have values not open to the public. Through the processing using these constants, the attacks 1 and 3 can be prevented.

Differently from the decryption method of FIG. 15, at steps 1101 and 1102, with respect to a new base c×R, which is obtained by multiplying a constant R satisfying R>p and R>q by c, modular exponentiation of $c'_p := c \times R$ (mod p) and $c'_q := c \times R$ (mod q) is executed. At steps 1103 and 1104, exponential modular exponentiations modulo p and q wherein bases are these $c'_p$ and $c'_q$ thus corrected by R and exponents are $d_p$ and $d_q$ are executed, and the result is stored as $m'_p$ and $m'_q$. The resultant calculated values are $m'_p = (c \times R)^{d_p}$(mod p)=$R^{d_p} \times c^{d_p}$(mod p) and $m'_q = (c \times R)^{d_q}$(mod q)=$R^{d_q} \times c^{d_q}$(mod q). When these values are compared with $m_p = c^{d_p}$(mod p) and $m_q = c^{d_q}$(mod q), which are calculated through the modular exponentiation performed at steps 303 and 304 of FIG. 15, there is a difference derived from the constant $R^{d_p}$ or $R^{d_q}$. Processing for correcting this difference for calculating $c^{d_p}$(mod p) and $c^{d_q}$(mod q) is executed at steps 1105 and 1106. This processing is executed by using previously calculated constants $R_p = R^{-d_p}$(mod p) and $R_q = R^{-d_q}$(mod q) through calculation of $m_p := m'_p \times R_p$(mod p)=$c^{d_p} \times R^{d_p} \times R^{-d_p}$(mod p)=$c^{d_p}$ (mod p) and $m_q := m'_q \times R_q$(mod q)=$c^{d_q} \times R^{d_q} \times R^{-d_q}$(mod q)=$c^{d_q}$ (mod q). The correction for $m_p = c^{d_p}$(mod p) and $m_q = c^{d_q}$(mod q) is processing to be performed for CRT composition performed at step 1107. When these values are provided as inputs for the CRT composition of step 1107, m :=((u×($m_q - m_p$)) (mod q))×p+$m_p$=$c^d$(mod n) is calculated to be output.

Through the countermeasure 1 illustrated in FIG. 21, the processing for executing the modular exponentiation with p and q after multiplication by the constant R is performed at steps 1101 and 1102, resulting in realizing the countermeasure against the attack 1. Since R is the constant satisfying R>p and R>q, relationships of c×R≧p and c×R≧q always hold excluding a case of a special input of c=0, and hence, in the calculation of Z=X (mod Y) of the processing (MOD_ALG), there always arises branching of X≧Y alone, and hence, the attacker cannot obtain effective information. Merely when c=0, branching of X<Y is caused, but this merely leads to obvious information of 0<p.

Accordingly, when the countermeasure 1 illustrated in FIG. 21 is employed, the attacker cannot obtain effective information about p through the branching processing of MOD_ALG, and thus, the attack 1 can be prevented.

Furthermore, the countermeasure 1 illustrated in FIG. 21 also exhibits an effect to prevent the attack 3 for the following reason: Since c×R (mod p) and c×R (mod q) are calculated at steps 1101 and 1102 by using the constant R unknown to an attacker, the attacker cannot guess the value of c×R about c and hence cannot guess the value of c×R (mod p) as well. If the value of R is known to the attacker, a similar attack can be executed by executing the attack 3 with c=g×$R^{-1}$ (mod n) input instead of c. This is because the value calculated at step 1101 is c×R (mod p)=(g×$R^{-1}$)×R (mod p)=g (mod p) in this case, and the modular exponentiation is executed with respect to g, which can be controlled by the attacker, and hence, the attacker can attain a situation similar to that in the attack 3. A relational expression of $R^{-1}$(mod n)=$R^{-1}$(mod p) is used in this case, and this relational expression is derived from a generally known property, about n=p×q and an arbitrary integer a, of $a^{-1}$(mod n)=$a^{-1}$ (mod p)=$a^{-1}$(mod q). When R is an unknown constant, however, the attacker cannot calculate g×$R^{-1}$(mod n) by using g, and hence, the countermeasure 1 attains security against the attack 3.

In other words, the security of the countermeasure 1 is attained on the assumption that the constants R, $R_p$ and $R_q$ have values unknown to an attacker. As long as these constants are unknown to the attacker, the security is retained but there is a potential risk as follows: when common constants are used in all solids of the encryption device, if these constants are revealed from one solid, there is a potential risk that the security of all the solids is endangered. Furthermore, when the countermeasure 1 is employed, since it is necessary to store the constants R, $R_p$ and $R_q$ within the device, cost of memory addition for recording these values is required. Since the constant R satisfies the relationships of R>p and R>q, a memory area with at least a bit length of p or q is necessary. Assuming that the bit length of p or q is a half of the bit length of n, the memory area necessary for the constant R is an area of $(\log_2 n)/2$ bits. The memory area necessary for each of $R_p$ and $R_q$ is the same as that of p or q and is an area of $(\log_2 n)/2$ bits. In total, the memory area necessary for storing the constants R, $R_p$ and $R_q$ is an area of $3(\log_2 n)/2$ bits. In general RSA cryptosystem, a value not less than 1024 bits is used as n, and therefore, a memory area of 1536 bits or more is necessary. Additional cost of the amount of computation is that of multiplication by R performed at steps 1101 and 1102 and that of multiplication by $R_p$ and $R_q$ performed at steps 1105 and 1106, but the additional cost of these amounts of computation occupies a very small proportion in the whole amount of computation and is negligibly small.

In summary, the countermeasure 1 can prevent the attacks 1 and 3. The additional cost necessary for the countermeasure 1 is the memory area for storing the constants R, $R_p$ and $R_q$, and the necessary memory area is evaluated as $3(\log_2 n)/2$ bits (i.e., at least 1536 bits). Moreover, as a potential risk, when the constants R, $R_p$ and $R_q$ are commonly used in all solids of the encryption device, it is possible that the security of all the solids is endangered when these constants are revealed from one solid.

(Countermeasure 2)

A variety of countermeasures are known as a method for preventing the attack 2. All the countermeasures include, in common, processing of generating a random number within an encryption device in executing the calculation of $c^d$(mod n) and randomizing intermediate data generated in the middle of the calculation of $c^d$(mod n) by using a random number.

In the attack 2, an attacker simulates intermediate data created in the middle of the calculation of $c^d$(mod n) based on the input c and creates the difference curve represented by $G_1-G_0$ on the basis of the simulation. Therefore, the simulation performed in the attack 2 is made invalid by randomizing the intermediate data obtained in the middle of the calculation, so as to prevent the attack 2. Although the intermediate data generated in the middle of the calculation of the modular exponentiation of $c^d$(mod n) is randomized in this method, it is necessary to ultimately output the same value $c^d$ (mod n) as in the general modular exponentiation, and therefore, it is also necessary to release the randomization. As a countermeasure against the attack 2 through the randomization of the intermediate data, a variety of methods are known, which are different from one another in the method of randomizing and the method of releasing the randomization. Additional cost of the amount of computation and the memory necessary for the countermeasure depends upon the difference in these methods.

As a typical countermeasure against the attack 2, randomization of an exponent will now be described (as a countermeasure 2).

FIG. 22 illustrates a countermeasure against the attack 2 through the randomization of an exponent (i.e., the countermeasure 2). As a basic idea of this countermeasure, the randomization of an exponent used in the modular exponentiation is employed as the countermeasure against the attack 2. The randomization of an exponent is performed by using a randomized exponent $d'=d+r\times\phi(n)$ instead of an exponent d, whereas r is a random number of 20 bits, $\phi(x)$ is an order against a modulus x, and the order against the modulus x has a property of $a^{\phi(x)}$(mod x)=1 with respect to an arbitrary integer a. When there is a relationship of $n=p\times q$ between prime numbers p and q, it is known that $\phi(n)=(p-1)(q-1)$, $\phi(p)=p-1$ and $\phi(q)=q-1$.

Since a bit string of the exponent $d+r\times\phi(n)$ given by the random number r of 20 bits is randomly varied, the intermediate data obtained in the middle of the calculation of the modular exponentiation is randomized, but an ultimately calculated value is always equal to $c^d$(mod n) (see FIG. 23). The ultimately calculated value is always equal to $c^d$(mod n) because $c^{d+r\times\phi(n)}=c^d\times(c^{\phi(n)})^r$(mod n), and owing to the property of the order, $c^{\phi(n)}=1$(mod n) holds with respect to an arbitrary integer c, and therefore, $c^{d+r\times\phi(n)}=c^d\times(c^{\phi(n)})^r$(mod n)=$c^d\times(1)^r$(mod n)=$c^d$(mod n) holds with respect to an arbitrary random number r.

Additional cost, accompanying the countermeasure 2, of computation time is caused because $d'=d+r\times\phi(n)$ is used instead of the exponent d. While the bit length of the exponent d is $\log_2(n)$, the bit length of d' is $r\times\phi(N)$, which is given as $\log_2 n+20$. The processing time necessary for the modular exponentiation is obtained as (bit length of modulus)×(bit length of modulus)×(bit length of exponent). When the countermeasure 2 is employed, the bit length of the exponent is increased from $\log_2(n)$ to $\log_2 n+20$, and therefore, the computation time is increased, as compared with the computation time when the countermeasure 2 is not employed, to $(\log_2 n+20)/(\log_2 n)$. When $\log_2 n=1024$, 1044/1024=1.02, and therefore, the computation time is slightly increased as the additional cost, but this increase occupies a very small proportion in the whole computation time. Therefore, the countermeasure 2 is known as an efficient countermeasure. As additional cost of a memory area, a 20-bit area for storing the random number r and a $\log_2 n$-bit area for storing the order $\phi(n)$ that is not used in the decryption without the CRT illustrated in FIG. 14 are necessary.

In summary, the countermeasure 2 can prevent the attack 2. The additional cost of the amount of computation necessary for the countermeasure 2 corresponds to the cost of using the exponent $d'=d+r\times\phi(n)$ instead of the exponent d, and the amount of computation is $(\log_2 n+20)/(\log_2 n)$ times as large as that in the processing not employing the countermeasure illustrated in FIG. 14. When n has a 1024-bit value, however, the increased amount of computation is as small as 2%. As the additional cost of the memory area, a memory area of $(20+\log_2 n)$ bits in total is necessary for both the random number r and the order $\phi(n)$. Since n is generally a value of 1024 or more bits, an additional memory of 1044 bits or more is necessary.

(Summary of Countermeasure 1 and Countermeasure 2)

At this point, features of the conventionally known countermeasures 1 and 2 will be summarized. The countermeasure 1 (namely, the countermeasure for the decryption method of FIG. 15) is effective against the attacks 1 and 3, and the additional cost of the amount of computation is the same as that illustrated in FIG. 15 and the additional cost of the memory is $3(\log_2 n)/2$ bits ($\geq 1536$ bits). Incidentally, when the constants R, $R_p$ and $R_q$ are commonly used in all solids, the countermeasure 1 has a problem that all the solids may be made vulnerable if the constants R, $R_p$ and $R_q$ are revealed. On the other hand, the countermeasure 2 (namely, the countermeasure for the decryption method of FIG. 14) is effective against the attack 2, and the additional cost of the amount of computation is $(\log_2 n+20)/(\log_2 n)$ times as large as that of FIG. 14, and the additional cost of the memory is $(20+\log_2 n)$ bits ($\geq 1044$ bits).

(Problems of Countermeasures 1 and 2)

As described so far, the attacks described as the attacks 1, 2 and 3 are known against the RSA decryptosystems illustrated in FIGS. 14 and 15, and these attacks can be prevented by the conventional countermeasures described as the countermeasures 1 and 2. In other words, the conventionally known attacks 1, 2 and 3 can be prevented by the conventionally known countermeasures 1 and 2.

Incidentally, guess methods using the SPA or the DPA for the common key cryptosystem such as DES or AES and guess methods using the SPA or the DPA for the RSA cryptosystem or the public key cryptosystem such as elliptical curve cryptosystem are disclosed in documents mentioned below. Also, a decryption method highly secured against a side channel attack is also disclosed in documents mentioned below.

International Publication WO00/59157 pamphlet

Paul Kocher, Joshua Jaffe, and Benjamin Jun, "Differential Power Analysis", in proceedings of Advances in Cryptology-CRYPTO '99, Lecture Notes in Computer Science vol. 1666, Springer-Verlag, 1999, pp. 388-397

Thomas S. Messerges, Ezzy A. Dabbish and Robert H. Sloan "Power Analysis Attacks of Modular exponentiation in Smartcards", Cryptographic Hardware and Embedded Systems (CHES'99), Lecture Notes in Computer Science vol. 1717, Springer-Verlag, pp. 144-157

Jean-Sebastein Coron, "Resistance against Differential Power Analysis for Elliptic Curves Cryptosystems", Cryptographic Hardware and Embedded Systems (CHES'99), Lecture Notes in Computer Science vol. 1717, Springer-Verlag, pp. 292-302, 1999

Alfred J. Menezes et al., "HANDBOOK OF APPLIED CRYPTOGRAPHY" (CRC press) pp. 615

SUMMARY

According to an aspect of the invention, a decryption processor for calculating a plaintext m through decryption of a ciphertext c by using a first prime number p, a second prime number q, a public key e and a private key d, includes, a first modular exponentiation part that calculates a value $m'_p$ through modular exponentiation modulo the first prime number p, wherein an exponent is a value obtained by shifting, with a numerical value s, a value $d_p$ calculated in accordance with $d(\mod(p-1))$ and a base is a value $c_p$ calculated in accordance with $c(\mod p)$; a second modular exponentiation part that calculates a value $m'_q$ through modular exponentiation modulo the second prime number q, wherein an exponent is a value obtained by shifting, with the numerical value s, a value $d_q$ calculated in accordance with $d(\mod(q-1))$ and a base is a value $c_q$ calculated in accordance with $c(\mod q)$; a composition part that calculates a value $m_s$ through calculation of $((u \times (m'_q - m'_p))(\mod q)) \times p + m'_p$ by using the values $m'_p$ and $m'_q$ calculated respectively by the first modular exponentiation part and the second modular exponentiation part, and a private key u corresponding to a calculation result of $p^{-1}(\mod q)$; and a shift release part that calculates the plaintext m through calculation of $m_s \times (c^s(\mod n)) (\mod n)$ by using the value $m_s$ calculated by the composition part.

The object and advantages of the invention will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a countermeasure against attack 4 utilizing randomization of a base according to a presupposed technology of an embodiment of the invention.

FIG. 4 is a diagram illustrating exemplary basic processing performed by the decryption processor of the embodiment.

FIG. 5 is a diagram illustrating an attack algorithm targeting a decryption processor executing a read/write operation of an operation result of $x^g(\mod p)$ on a data value controllable by an attacker in which the DPA is used for determining whether or not $(x+\epsilon)^g < p$.

FIG. 6 is a diagram illustrating expressions used for obtaining an approximate value of p in the embodiment.

FIG. 7 is a diagram illustrating exemplary processing of Example 1 according to the embodiment.

FIG. 8 is a diagram illustrating exemplary processing of Example 2 according to the embodiment.

FIG. 9 is a diagram illustrating exemplary processing of Example 3 according to the embodiment.

FIG. 10 is a diagram illustrating exemplary processing of Example 4 according to the embodiment.

FIG. 11 is a diagram illustrating exemplary processing of Example 5 according to the embodiment.

FIG. 12 is a diagram illustrating exemplary processing of Example 6 according to the embodiment.

FIG. 13 is a diagram illustrating a method of RSA cryptosystem.

FIG. 14 is a diagram illustrating a method of decryption without CRT for the RSA.

FIG. 15 is a diagram illustrating a method of decryption with the CRT for the RSA.

FIG. 16 is a diagram illustrating an attack algorithm for narrowing a range of p through a combination of dichotomizing search and power analysis.

FIG. 17 is a diagram illustrating modular exponentiation by the window method.

FIG. 18 is a diagram illustrating processing in the window method.

FIG. 20 is a diagram illustrating an attack algorithm targeting a decryption processor executing a read/write operation of an operation result of x (mod p) on a data value x controllable by an attacker in which the DPA is used for determining whether or not $x+\epsilon < p$.

FIG. 21 is a diagram illustrating a countermeasure algorithm against attacks 1 and 3.

FIG. 22 is a diagram illustrating a countermeasure algorithm against attack 2.

DESCRIPTION OF EMBODIMENTS

Figure 2:
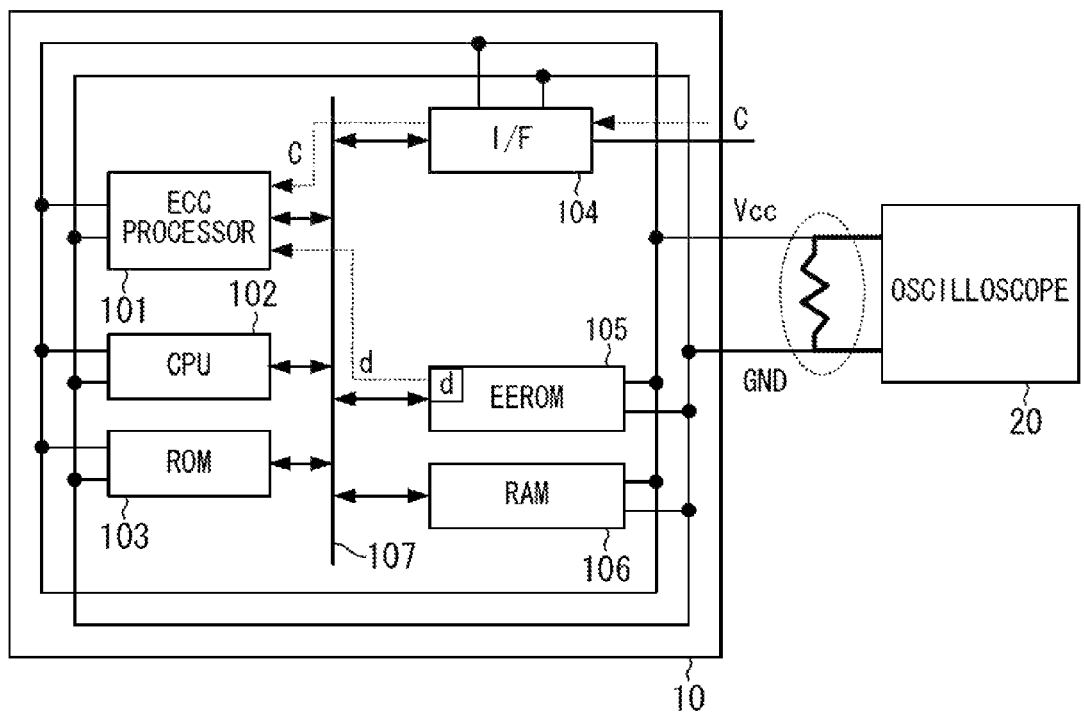
FIG. 2 is a diagram illustrating an exemplary hardware configuration of a decryption processor according to the embodiment.

The aforementioned countermeasures, however, do not always have resistance against a new attacking method. In general, a countermeasure in security is meaningless unless the countermeasure is equally resistive against all attacking methods. For example, even through one countermeasure may prevent nine kinds of attacking methods out of ten kinds of attacking methods, if the countermeasure cannot prevent the remaining one attacking method, a private key is revealed by that attacking method, and hence, an attacker may freely decrypt all encrypted data. Accordingly, a countermeasure for an encryption device is preferably be resistive against all attacking methods. Therefore, a countermeasure is preferably resistive not only against the conventional attacks 1, 2 and 3 but also against a new attacking method realized by extending the conventional attacking methods.

Now, an example of the new attacking method obtained by extending the conventional attack 3 will be described (as attack 4), and it will be described that the attack 4 cannot be prevented by the conventional countermeasures 1 and 2.

(Attack 4)

The new attacking method is achieved by extending the attack against the decryption with the CRT described as the attack 3 and illustrated in FIG. 15. The attack 3 targets the modular exponentiation expressed as $c_p:=c$ (mod p) and $c_q:=c$ (mod q) performed at steps 301 and 302 of FIG. 15. Since the attack targets this processing, a modular exponentiation for c, which is controllable by an attacker, is carried out, and the attack based on the DPA illustrated in FIG. 20 is employed for determining whether or not $c<p-\epsilon$ for the prime number p (wherein $\epsilon$ is an error parameter with a small value of approximately 1000), and this information is used for narrowing candidate values of the prime number p to a number applicable to brute force approach.

When this idea is applied so as to employ the attacking method based on the DPA illustrated in FIG. 20 in the processing of $m_p:=c_p^{dp}(\mod p)$ and $m_q:=c_q^{dq}(\mod q)$ of step 303 of FIG. 15, the number of candidate values of the prime number p may be similarly narrowed. Hereinafter, this attack is designated as the attack 4, and this attacking method will now be described.

Figure 24:
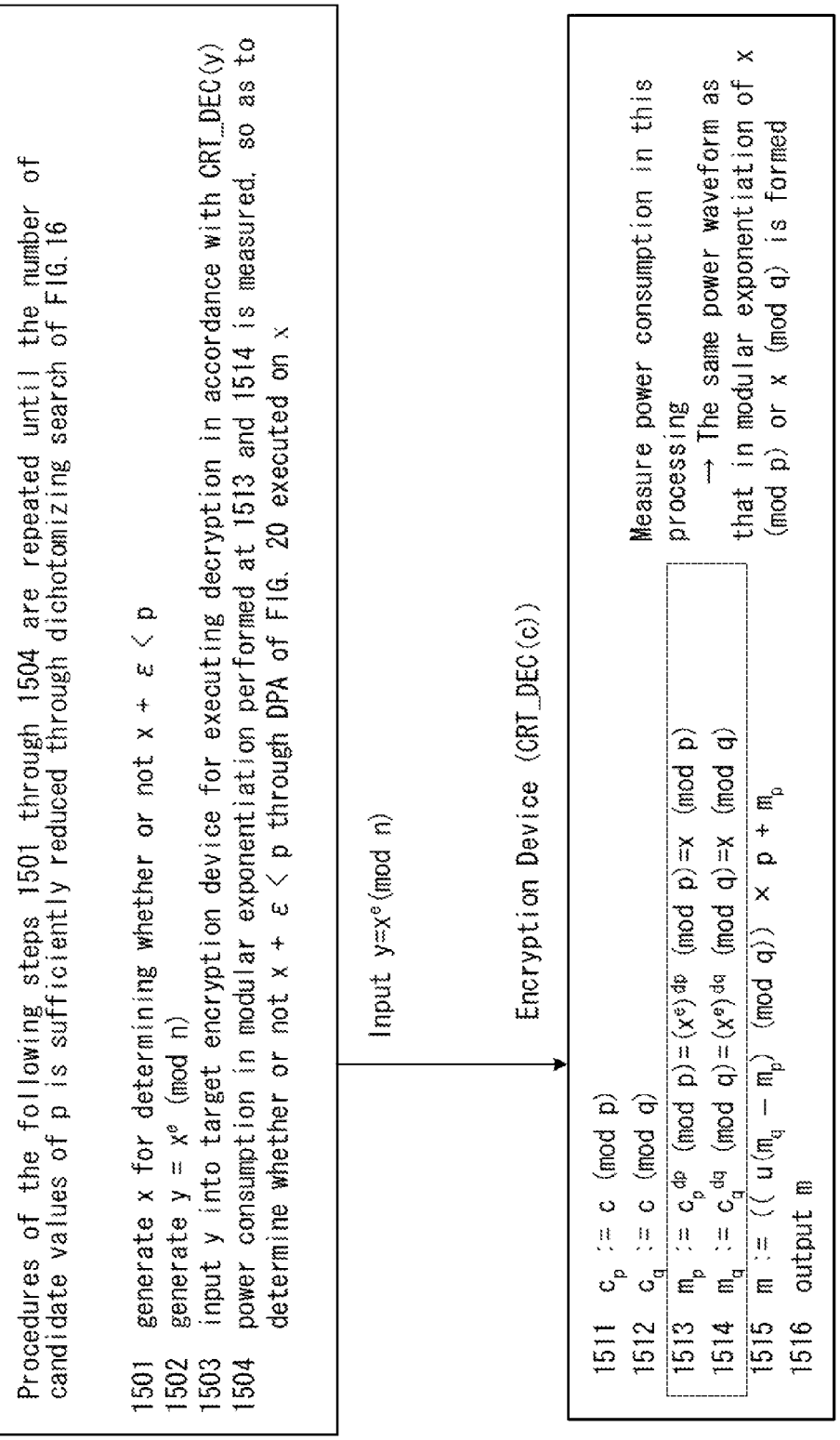
FIG. 24 is a diagram explaining the contents of attack 4.

The basic idea of the attack 4 is illustrated in FIG. 24. This idea is different from that of the attack 3 in a method of giving the processing CRT_DEC(c) of FIG. 15. In the conventional method, an attacker generates x for the determination of $x+\epsilon<p$, and the resultant x is directly given to the input c of FIG. 15 as CRT_DEC(x). On the contrary, in the attack 4, an attacker generates x for the determination of $x+\epsilon<p$, and a value $y=x^e(\mod n)$ calculated based on public keys e and n is generated with respect to x, so as to give CRT_DEC(y) as the input to the processing of FIG. 15. Since the public keys e and n have values open to the outside of the encryption device, the attacker can freely generate $x^e(\mod n)$ from x.

When $x^e(\mod n)$ is given instead of x, in the modular exponentiation performed at steps 303 and 304 of FIG. 15, namely, at steps 1513 and 1514 of FIG. 24, processing for respectively calculating $m_p:=(_xe)^{dp}$ (mod p)=x (mod p) and $m_q:=(x^e)^{dq}(\mod q)=x (\mod q)$ and reading/writing the resultant values in a memory of the encryption device is caused (the equalities hold because of a known property that $(a^e)^{dp}=1$ (mod p) and $(a^e)^{dq}=1(\mod q)$ hold for an arbitrary integer a with respect to e, $d_p$, $d_q$, p and q, that is, keys of the RSA cryptosystem). In other words, power consumption substantially equal to power consumption caused in executing the modular exponentiations of x (mod p) and x (mod q) for x controllable by the attacker is caused, and therefore, the attacking method based on the DPA illustrated in FIG. 20 may be employed. When the attacking method based on the DPA illustrated in FIG. 20 is employed, the number of candidate values of the prime number p may be narrowed to a number applicable to exhaustive search through the dichotomizing search illustrated in FIG. 16, so as to obtain the prime numbers p and q.

This attack 4 may not be prevented by the conventional countermeasures 1 and 2 due to the following reasons. In the countermeasure 1, in order to correctly execute the CRT composition, the constants $R_p$ and $R_q$ are multiplied for calculating $m_p=c^{dp}(\mod p)$ and $m_q=c^{dq}(\mod q)$ at steps 1105 and 1106 of FIG. 21 corresponding to a stage immediately before the CRT composition. In other words, when $c=x^e(\mod n)$ is input, the calculation results obtained at steps 1105 and 1106 are x (mod p) and x (mod q), and therefore, the attack 4 may be successful.

Figure 23:
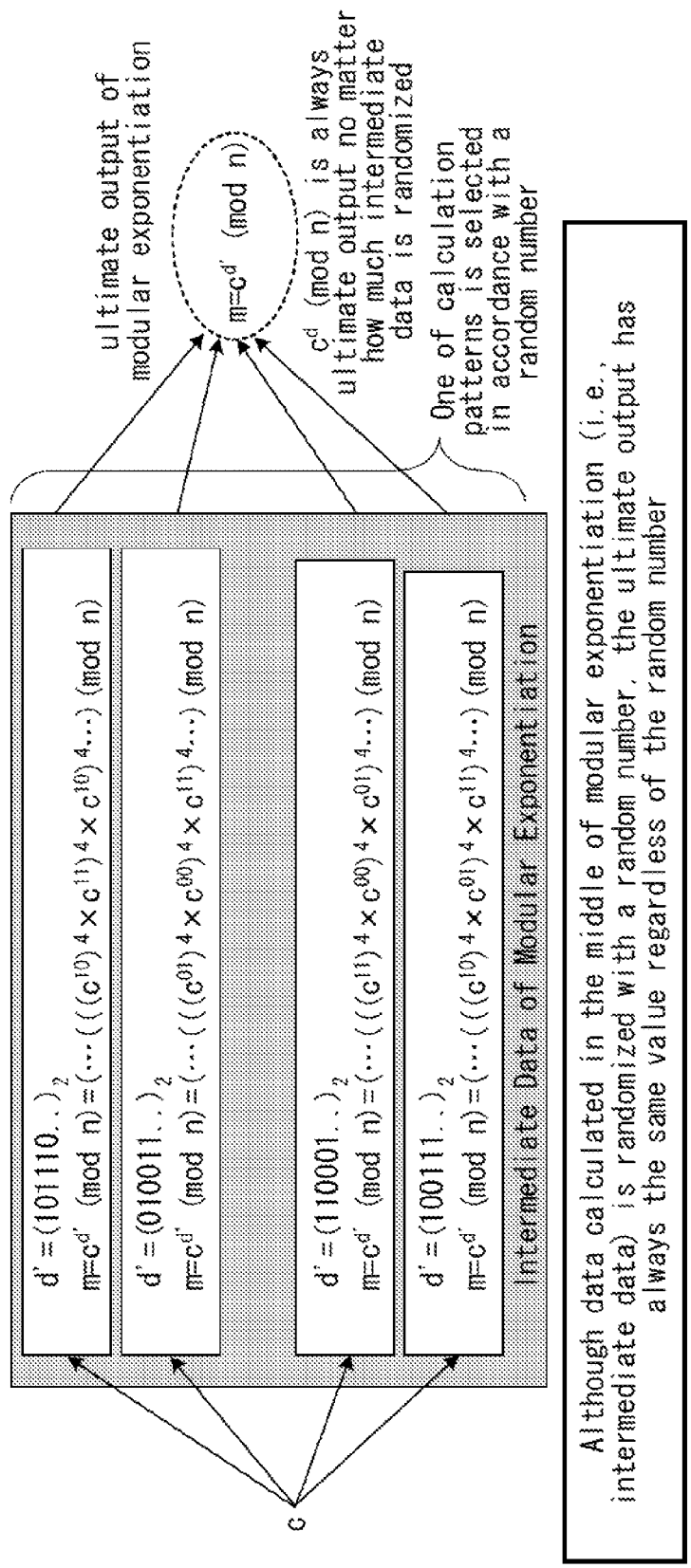
FIG. 23 is a diagram illustrating a process for randomizing intermediate data of the countermeasure 2 and outputting an operation result obtained after releasing the randomization.

Alternatively, the countermeasure 2 is not a countermeasure against the decryption with the CRT, but is a countermeasure against the modular exponentiation, and hence is applicable to the modular exponentiation of steps 303 and 304 of FIG. 15. Even through this application, however, the attack 4 may not be prevented for the following reason: although intermediate data of the modular exponentiation is randomized as illustrated in FIG. 23, ultimately calculated values are always constant, and when this processing is applied to the modular exponentiation performed at steps 303 and 304 of FIG. 15, $m_p=c^{dp}(\mod p)$ and $m_q=c^{dq}(\mod q)$ are calculated. Therefore, the attack 4 may be executed. In this manner, there is a problem that the conventional countermeasures 1 and 2 are not resistive against the attack 4.

In an embodiment described below, a countermeasure against problem 1 of vulnerability against the attack 4 will be described. Furthermore, the countermeasure provided in this embodiment not only prevents the attack 4 but may also incur minimum additional costs for the computation and memory. Before describing the countermeasure of this embodiment, a basic countermeasure for preventing the attack 4 will be described as a premise. This countermeasure is also based on the idea of changing the value of a base, and although the idea of changing the value of a base may cope with the attack 4, the countermeasure has another problem, which will be described below. Thereafter, the countermeasure against the attack 4 according to this embodiment will be described.

(Premise)

The countermeasure described as the premise (hereinafter referred to as the countermeasure 3) is illustrated in FIG. 1. In this countermeasure, the decryption with the CRT is not directly executed for a base c but a random number S is generated (at step 1601) and the decryption with the CRT, namely, CRT_DEC ($c \times S$ (mod n)), is executed after randomization with $c \times S$ (mod n), and the result is stored in a work variable area W (at step 1602). As a result, $W=(c \times S)^d(\mod n)$ is calculated. In order to release the randomization with the random number S, the decryption with the CRT is executed with an inverse of the random number S in accordance with processing of CRT_DEC ($S^{-1}(\mod n)$), and the result is stored as m. As a result, $m=S^{-d}(\mod n)$ is calculated. Ultimately, an operation of $m:=(c \times S)^d \times S^{-d}=c^d(\mod n)$ is performed in accordance with $m:=W \times m(\mod n)$, and the result of releasing the randomization is stored as m.

Through the series of calculations, a base input in the processing of CRT_DEC is randomized with S, and therefore, the attack 4 may be prevented. On the contrary, additional cost accompanying the countermeasure is caused. As additional cost of the amount of computation, since the decryption with the CRT is executed twice, the amount of computation is twice as large as that of FIG. 15. As additional cost of the memory area, a work area for storing the random number S and a work area W for storing the result of the decryption with the CRT performed at step 1602 are additionally desired.

Since the random number S has the same bit length as the prime numbers p and q, a memory of $(\log_2 n)/2$ bits is preferred for the random number S. Since a bit length the same as that of n is preferred for the work area W, a memory of $(\log_2 n)$ bits is preferred for the work area W.

This evaluation of the additional cost is a minimum cost evaluation independent of the form of implementation and is a very optimistic evaluation obtained by ignoring additional costs of a memory area for calculating c×S (mod n) at step 1602, a temporary memory area for calculating $S^{-1}$(mod n), and the amount of computation for calculating the inverse $S^{-1}$ of the random number S.

In summary, although the attack 4 may be prevented through the randomization of a base by the countermeasure 3, there is a problem that additional costs due to the amount of computation and the memory are generated. The amount of computation is twice as much as that of the processing illustrated in FIG. 15, and the additional cost of the memory is $(3\log_2 n)/2$ bits.

The problems of the countermeasure 3 are as follows:

(Problem 2) the amount of computation is twice as large as that of the processing not employing the countermeasure illustrated in FIG. 15; and (Problem 3) a memory area of $(3\log_2 n)/2$ bits 1536 bits) is desired as the additional memory.

(Embodiment)

Figure 3:
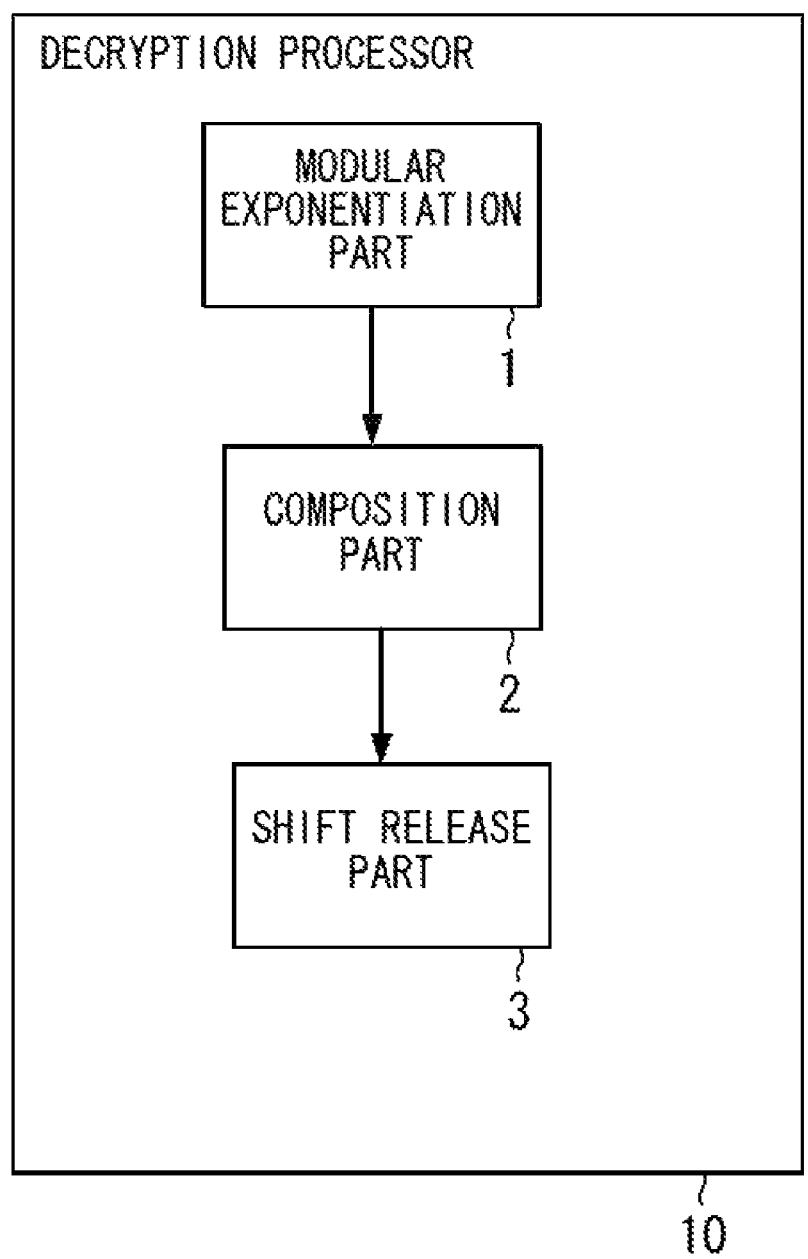
FIG. 3 is a diagram illustrating exemplary functional blocks of the decryption processor of the embodiment.

With respect to a decryption processor for overcoming the aforementioned problems of the presupposed technology, an example of the hardware configuration is illustrated in FIG. 2 and an example of functional blocks is illustrated in FIG. 3.

The hardware configuration of the decryption processor will be first described with reference to FIG. 2. The decryption processor 10 of this embodiment may be built in an encryption device such as a smartcard. As illustrated in FIG. 2, the decryption processor 10 of this embodiment includes an ECC (Elliptic Curve Cryptosystem) processor 101, a CPU (Central Processing Unit) 102, a ROM (Read-Only Memory) 103, an I/F 104, an EEROM (Electrically Erasable ROM) 105, a RAM (Random Access Memory) 106, and a data bus 107 connecting the elements. Furthermore, it is assumed that the decryption processor 10 has terminals Vcc and GND connected to an oscilloscope 20 measuring the power consumption for performing the PA. The ECC processor 101 performs the following processing on a ciphertext C, which is externally obtained through the I/F 104, based on a private key d stored in the EEROM 105. Also, the CPU 102 controls the decryption processor 10. The ROM 103 stores programs to be executed by the ECC processor 101 and the CPU 102. The I/F 104 mediates input and output of data to and from the decryption processor 10. The EEROM 105 is a ROM in which data is electrically erasable and stores the private key d for the ECC. The RAM 106 temporarily stores programs to be executed by the ECC processor 101 and the CPU 102.

Next, an example of the functional blocks of the decryption processor 10 will be described with reference to FIG. 3. The decryption processor 10 includes a modular exponentiation part 1 (including a first modular exponentiation part and a second modular exponentiation part), a composition part 2, and a shift release part 3. These functional parts are realized by the ECC processor 101 executing a program having an algorithm described below.

In calculating a plaintext m from a ciphertext c by using prime numbers p and q, a public key e and a private key d, the modular exponentiation part 1 calculates a value $m'_p$ through modular exponentiation modulo p wherein an exponent is a value obtained through a shift operation, with a numerical value s, of a value $d_p$ calculated in accordance with d(mod(p−1)), and a base is a value $c_p$ calculated in accordance with c(mod p).

Furthermore, the modular exponentiation part 1 calculates a value $m'_q$ through modular exponentiation modulo p wherein an exponent is a value obtained through the shift operation, with the numerical value s, of a value $d_q$ calculated in accordance with d(mod(q−1)), and a base is a value $c_q$ calculated in accordance with c(mod q).

The composition part 2 calculates a value $m_s$ through calculation of $((u \times (m'_q - m'_p)(\bmod q)) \times p + m'_p$ by using the values $m'_p$ and $m'_q$ calculated by the modular exponentiation part 1 and a private key u corresponding to the calculation result of $p^{-1}$(mod q).

The shift release part 3 calculates the plaintext m by calculating $m_s \times (c^s (\bmod n))(\bmod n)$ by using the value $m_s$ calculated by the composition part 2.

The basic idea for overcoming the aforementioned problems of the presupposed technique is illustrated in FIG. 4. When the countermeasure of the presupposed technique is to be employed for preventing the attack 4, the aforementioned problems are caused. Specifically, in employing the method in which a base c is randomized, since it is preferable to release the result of the randomization, the computation time is preferably doubled for executing the release processing. Such a problem is caused because the base c of the decryption with the CRT is randomized in the countermeasure of the presupposed technique. When a constant or a random number used in randomization is indicated by R, calculation expressed as $m := (c \times R)^d \times (R^{-1})^d$ (mod n) is executed for ultimately calculating $c^d$(mod n). In other words, in order to release the randomization of a randomized value expressed as $(c \times R)^d$ and return it to $c^d$(mod n), a value expressed by $(R^{-1})^d$(mod n) is desired. In order to obtain this value, the decryption with the CRT is additionally performed once in the countermeasure of the presupposed technique, and hence, the amount of computation is increased. In other words, in order to execute randomization of a base, the amount of computation or a memory area may be increased as additional cost.

In consideration of this, according to this embodiment, in order to overcome the problems, shifting (and randomization) with an exponent is employed instead of the randomization with a base. When such a randomized or shifted value is released before the CRT composition, however, a value of $c^{dp}$ (mod p) or $c^{dq}$(mod q) is generated in the middle of the calculation, which causes vulnerability against the attack 4, and therefore, the randomized or shifted data is released after completing the CRT composition. The release of the shifting or randomization is performed as follows. Through the CRT composition at step 1905, $m_s := c^{d-s}$(mod n) is calculated, and in accordance with the result of this calculation, $c^s$(mod n) is multiplied in accordance with $m := m_s \times c^s (\bmod n) = c^{d-s} \times c^s$ (mod n) = $c^d$(mod n) at step 1906, and thus, the shifting or randomization is released so as to obtain $c^d$(mod n). When the shifting/randomization is released after the CRT composition, the attack 4 may be prevented, and the problem 1 of the vulnerability against the attack 4 may be overcome.

If s has a large value of 1024 bits or the like, a large amount of computation or a large memory area is desired as the additional cost in this embodiment, but the security may be retained with s set to a small value of approximately 2 or 3 when the shifting with an exponent is employed as in this embodiment, and therefore, the additional cost for this countermeasure is very small. Specifically, an effort to calculate $(c^s)$(mod n) based on c for multiplying by the calculation result of step 1905 corresponds to the additional cost. Since c is already given, the amount of computation for calculating $c^s \pmod{n}$ based on s with a small value of approximately 2 or 3 is s at most, which is negligibly small as compared with the entire amount of computation. Thus, the problem 2 may be overcome.

Furthermore, an additional memory for calculating $c^s \pmod{n}$ corresponds to a memory area for storing the parameter s, which has a value of $\log_2 s$ bits. When s has a small value of approximately 2 or 3, the bit value is 2 bits at most, which is a very small memory area as the additional cost. Thus, the problem 3 is overcome.

Furthermore, a condition for security of this embodiment against the attack 4 is that there is a relationship of $e \times s > 3$ between the public key e and the shift parameter s. Since the public key e of the RSA cryptosystem satisfies $e \geq 3$, this condition is always met when the parameter s has a value not less than 2, and hence, the parameter s may be a small value of approximately 2 or 3. The reason why the condition for the security against the attack 4 is $e \times s > 3$ will be described later. As far as the condition of $e \times s > 3$ is met, the security may be retained even if the value of the parameter s is open to an attacker. In other words, even if the parameter s is revealed, the security may be retained.

Accordingly, when the method of this embodiment is employed, the decryption with the CRT that addresses all the problems 1, 2 and 3 may be realized.

At this point, the criterion, $e \times s > 3$, of the security against the attack 4 in this embodiment will be described. As the criterion of the parameter setting for attaining security against the attack 4 by employing the method of this embodiment, the condition $e \times s > 3$ met by the public key e and the shift parameter s of the exponent is recommended. Now, the reason for this criterion of the security will be described.

In describing the reason for the criterion of the security, an attack corresponding to an extended type of the attack 4 will be described. When this extended type attack is used, bit values corresponding to upper 1/g bits out of all the bits of the prime number p may be guessed by measuring the power consumption in calculation of $x^g \pmod{p}$ with respect to x controllable by an attacker. This property is expressed as processing of (EXTEND_DPA) as follows:

(EXTEND_DPA): When the decryption processor 10 performs calculation of $x^g \pmod{p}$ for a prime number p, an attacker may obtain bit values corresponding to upper 1/g bits out of all the bits of the prime number p by executing the DPA utilizing the power consumption in the calculation.

For example, in an encryption processor performing calculation of $x^3 \pmod{p}$, when this extended type attack is used, bit values of upper ⅓ bits of the prime number p are revealed. Even when part of the bit values of the prime number p is revealed, the value of the prime number p is not always obtained. A general criterion of an allowable range of partial bit value leakage of a prime number p is disclosed in Johannes Blomer and Alexander May, "New Partial Key Exposure Attacks on RSA", CRYPTO 2003, pp. 27-43, LNCS2729. According to the criterion disclosed in this document, it is known that the prime factorization of $n = p \times q$ succeeds when bit value of upper ½ bits of the prime number p is revealed. Accordingly, in consideration of the extended type attack, partial bit values of the prime number p to be revealed are preferably suppressed to be smaller than upper ½ bits.

Such an extended type attack is assumed because when the exponential shifting with the parameter s is employed, although calculation of x (mod p) is avoided, calculation of $y^{(es-1)} \pmod{p}$ is executed instead. This is because when $c = x^e \pmod{n}$ is substituted in the calculation of $m'_p = c_p^{dp-s}$ (mod p) of step 1903, in consideration of the property of $(x^e)^{dp} = x \pmod{p}$, $m'_p = (x^e)^{dp-s} \pmod{p} = (x^e)^{dp} \times (x^e)^{-s} = x^{(1-es)} \pmod{p} = y^{(es-1)} \pmod{p}$ is given (wherein $y = x^{-1} \pmod{n}$ that is equal to $x^{-1} \pmod{p}$). Since the countermeasure of this embodiment includes this calculation, even when the extended DPA of the attack 4 is executed against the calculation, the revealed partial bit values of the prime number p are preferably suppressed to be smaller than the upper ½ bits. When the processing of (EXTEND_DPA) is applied, it is understood that $e \times s < 1 > 2$ is the condition for the security. In other words, even when the extended type attack is employed, $e \times s > 3$ is the condition for retaining the security of the RSA cryptosystem.

Next, the principle and the method of the extended type attack of the attack 4 described as the processing of (EXTEND_DPA) will be described.

In the attack 4, it is determined whether or not $x + \epsilon < p$ with respect to x controllable by an attacker by using the DPA attack illustrated in FIG. 20. The DPA attack of FIG. 20 may determine whether or not $x + \epsilon < p$ for the following reason. With respect to a data string $a_i$ controllable by the attacker and satisfying $x \leq a_i \leq x + \epsilon$, when power consumption in reading/writing data expressed as $a_i \pmod{p}$ is measured so as to create difference curves of steps 1002 and 1003, if a sufficiently high spike appears on all the difference curves, it may be determined that $a_i < p$ with respect to all the data strings $a_i$, and hence, it is determined that $a_i \leq x + \epsilon < p$.

This determination method may be extended to a case where power consumption in reading/writing data expressed as $(a_i)^g \pmod{p}$, wherein g is a constant, is measured. This extended type DPA is illustrated in FIG. 5.

The principle of successfully performing this attack is the same as that of the attack illustrated in FIG. 20. The result of modular exponentiation expressed as $Z = X^g \pmod{Y}$ is $Z = X^g$ when $X^g < Y$ regardless of the algorithm implemented for the modular exponentiation. In other words, the value Z to be read or written in the decryption processor 10 as the output result Z is X when $X < Y$. In the above-described sets $G_1$ and $G_0$, when $(a_i)^g < p$, namely, $(x + \epsilon)^g < p$, with respect to all bases $a_i$ expressed as $x \leq a_i < x + \epsilon$, all the values calculated as $a_i \pmod{p}$ are $a_i$, which is read/written in a memory within the decryption processor 10. The numbers of zero's (0's) and one's (1's) included in the sets $G_{1,j}$ and $G_{0,j}$ including the calculation results of $a_i \pmod{p}$ are largely biased in all the difference curves with $j = 0, 1, \ldots, \log_2 \epsilon - 1$, and hence, a spike as illustrated in FIG. 19(B) appears on the power difference curve represented by $G_{1,j} - G_{0,j}$ with respect to all values of j, otherwise no spike or a low spike appears.

Figure 19A:
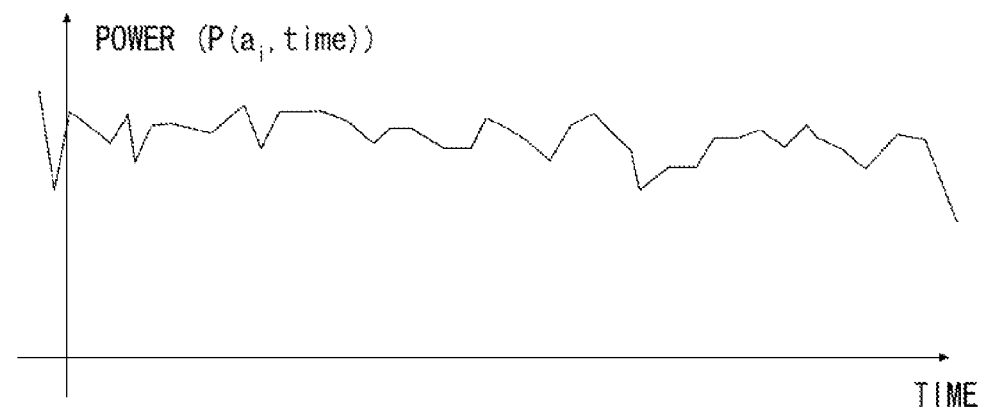
FIGS. 19(A), 19(B) and 19(C) are diagrams respectively illustrating a power consumption curve, a power difference curve having a spike, and a substantially even power difference curve.
Figure 19B:
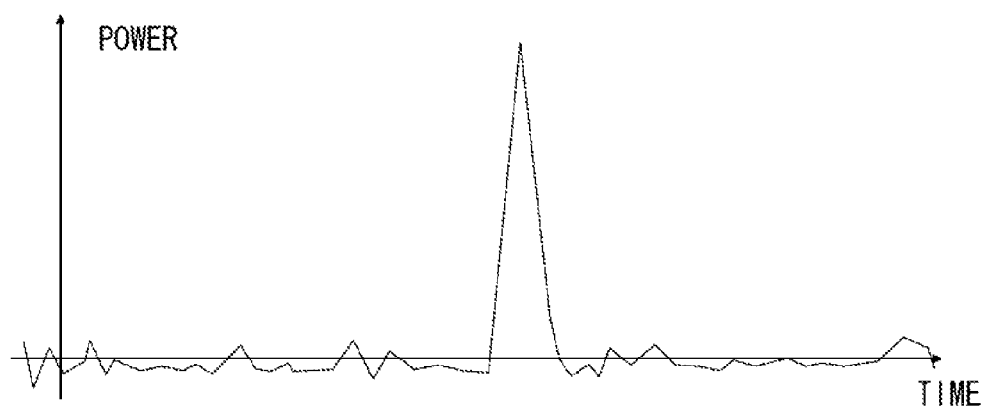
Figure 19C:
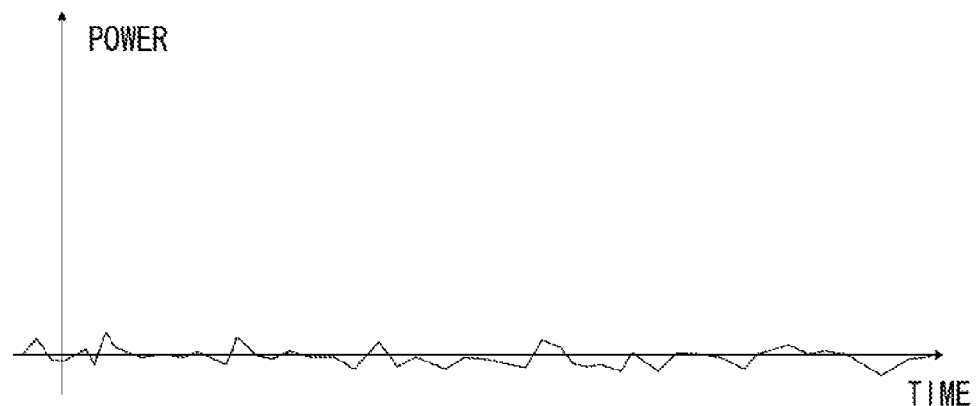

Accordingly, when a spike as illustrated in FIG. 19(B) appears in a sufficient height on the power difference curve represented by $G_{1,j} - G_{0,j}$, it may be determined that $(x + \epsilon)^g < p$.

When the power analysis illustrated in FIG. 5 is applied to step 404 of the dichotomizing search algorithm of FIG. 16, the maximum value of x satisfying $(x + \epsilon)^g > p$ may be obtained. In other words, an integer value of x with which the value of $(x + \epsilon)^g$ is the closest to p may be obtained. When x is obtained, the attacker may obtain bit values of upper 1/g bits of the prime number p. This is because $(x + \epsilon)^g = p$, namely, $x = p^{1/g} - \epsilon$, and hence, when x is raised to the power g, an approximate value of p may be obtained. The calculation expressions are illustrated in FIGS. 6(A) and 6(B), and in the expression of FIG. 6(A), a term in which the degree of p is not more than $(g-2)/g$ is much smaller than the magnitude of p, and hence may be approximated as expressed in FIG. 6(B). In other words, when x is raised to the power g, the approximate value of p may be obtained within an error range of $\epsilon g \times p^{(g-1)/g}$. This error, $\epsilon g \times p^{(g-1)/g}$, affects bit values of lower $(g-1)/g$ bits of the prime number p, and hence, the bit values of the upper 1/g bits are not affected by this error. Therefore, the attacker obtains the value x with which $(x+\epsilon)^g$ is the closest to p through the dichotomizing search of FIG. 16 and the DPA of FIG. 5, and when $x^g$ is calculated with respect to the obtained x, bit values of the upper 1/g bits of the prime number p may be guessed.

EXAMPLES

According to the algorithm illustrated in FIG. 4, 2×3=6 examples may be assumed: two examples about the type of the error parameter s (i.e., a random number or a constant) and three examples about the calculation method for $c^s$(mod n) of step 1906 (i.e., two examples of multiplications performed by $\log_2 s$ times by employing the binary method and one sort of multiplication performed by s times). Now, the respective examples will be described. In calculating $c^s$(mod n) by the binary method, the amount of computation is reduced to $2 \times \log_2 s$ while one work variable of $\log_2 n$ bits is additionally desired. For this additional variable, an additional memory of $\log_2 n$ bits is desired. Even though such a work memory is additionally used, the additional memory is still smaller than the additional memory of $3(\log_2 n)/2$ bits described as the problem 3, and hence, this method is a superior method. As far as a small parameter s of approximately 2 or 3 is used, the example where the multiplication is performed by s times for calculating $c^s$(mod n) is more efficient because the example does not need a work memory and the number of multiplications is substantially the same.

Example 1

FIG. 7 illustrates an algorithm used in Example 1. In this example, an error parameter s is given as a constant, and for calculating $c^s$(mod n), c is multiplied by s times (at step 2106). Differently from the decryption with the CRT illustrated in FIG. 15, shifting processing of an exponent is executed by using the constant s at steps 2103 and 2104 and c is multiplied by s times at step 2106 for releasing the result of the shifting processing after the CRT composition.

The additional cost of the amount of computation corresponds to the amount of computation preferable for processing. When $\log_2 n$ is expressed as T, the amount of computation for the modular exponentiation of steps 2103 and 2104 is $2 \times (T/2)^3 = T^3/4$. On the other hand, the amount of computation for one multiplication of c modulo n is (bit length of modulus n)×(bit length of modulus n), and hence, when the multiplication is executed by s times, the amount of computation is $s \times T^2$. Specifically, while the basic amount of computation is $T^3/4$, the additional amount of computation is $sT^2$, and a proportion therebetween is $(s \times T^2)/(T^3/4) = (4s)/T$. In the case where, for example, $T = \log_2 n = 1024$, when the parameter s has a value of approximately 2 or 3, the proportion of the additional amount of computation is 12/1024 or less, and thus, the amount of computation is increased by approximately 1%. In this manner, the influence of the additional amount of computation on the entire amount of computation is negligibly small.

The additional cost of memory is a memory area $\log_2 s$ for storing the constant s and a memory area for the s multiplications for releasing the shifting. When the parameter s has a small value of approximately 2 or 3, the additional memory area is 2 bits at most, and this additional cost is negligibly small.

Example 2

FIG. 8 illustrates an algorithm used in Example 2. In this example, an error parameter s is given as a random number (at step 2200), and for calculating $c^s$(mod n), c is multiplied by s times (at step 2206). Differently from the decryption with the CRT illustrated in FIG. 15, randomization processing of an exponent is executed by using the random number s at steps 2203 and 2204 and c is multiplied by s times at step 2206 for releasing the result of the randomization processing after the CRT composition.

The additional cost of the amount of computation corresponds to the amount of computation for this processing. When $\log_2 n$ is expressed as T, the amount of computation for the modular exponentiation of steps 2203 and 2204 is $2 \times (T/2)^3 = T^3/4$. On the other hand, the amount of computation for one multiplication of c modulo n is (bit length of modulus n)×(bit length of modulus n), and hence, when the multiplication is executed by s times, the amount of computation is $s \times T^2$. Specifically, while the basic amount of computation is $T^3/4$, the additional amount of computation is $sT^2$, and a proportion therebetween is $(s \times T^2)/(T^3/4) = (4s)/T$. In the case where, for example, $T = \log_2 n = 1024$, when the random number s is randomly selected from 1, 2 and 3, the proportion of the additional amount of computation is 12/1024 or less, and thus, the amount of computation is increased by approximately 1%. In this manner, the influence of the additional amount of computation on the entire amount of computation is negligibly small. Even when the parameter s is a random number of 4 bits, $4s/T = 16 \times 4/1024 < 0.07$, and hence the amount of computation is increased by 7%, and therefore, the increase is negligibly small. When the parameter s has a further larger value, however, an example employing the binary method for calculating $c^s$(mod n) as in examples 3, 4, 5 and 6 below is more efficient from the viewpoint of the amount of computation.

The additional cost of memory is a memory area $\log_2 s$ for storing the random number s and a memory area for the s multiplications for releasing the randomization. When the parameter s has a small value of approximately 2 or 3, the additional memory area is 2 bits at most, and this additional cost is negligibly small.

Example 3

FIG. 9 illustrates an algorithm used in Example 3. In this example, an error parameter s is given as a constant, and for calculating $c^s$(mod n), multiplication is performed by $2 \times \log_2 s$ times by employing a left-to-right binary method (at steps 2307 through 2310).

The additional cost of the amount of computation corresponds to the amount of computation for executing the left-to-right binary method and is given as $2 \times \log_2 s$. When $\log_2 n$ is expressed as T, the amount of computation for the modular exponentiation of steps 2303 and 2304 is $2 \times (T/2)^3 = T^3/4$. On the other hand, the amount of computation for one multiplication of c modulo n is (bit length of modulus n)×(bit length of modulus n), and hence, when the multiplication is executed by $2 \times \log_2 s$ times, the amount of computation is $2 \times \log_2 s \times T^2$. Specifically, while the basic amount of computation is $T^3/4$, the additional amount of computation is $(2 \times \log_2 s) \times T^2$, and a proportion therebetween is $(2 \times \log_2 s \times T^2)/(T^3/4) = (8 \times \log_2 s)/T$. In the case where, for example, $T = \log_2 n = 1024$, when an 8-bit value is used as the constant s, the proportion of the additional amount of computation is 64/1024<0.07, and thus, the amount of computation is increased by approximately 7%. In this manner, the influence of the additional amount of computation on the entire amount of computation is negligibly small.

The additional cost of memory is a memory area $\log_2 s$ for storing the constant s and a memory area $\log_2 n$ of a work area W for executing the left-to-right binary method. When the parameter s has a value of approximately 8 bits, the sum of the additional memories is $8+\log_2 n$. As compared with the additional amount of memory of $1.5 \times \log_2 n$ preferable in the countermeasure 3, considering that $\log_2 n \geq 1024$ in a general RSA parameter, $8+\log_2 n < 1.5 \times \log_2 n$, and thus, the processing with a smaller amount of additional memory may be realized in this example.

Example 4

FIG. 10 illustrates an algorithm used in Example 4. In this example, an error parameter s is given as a constant, and for calculating $c^s \pmod n$, multiplication is performed by $2 \times \log_2 s$ times by employing a right-to-left binary method (at steps 2407 through 2410).

This example is the same as Example 3 except that the right-to-left binary method is employed. The additional cost of the amount of computation corresponds to the amount of computation for executing the right-to-left binary method and is given as $2 \times \log_2 s$. When $\log_2 n$ is expressed as T, the amount of computation for the modular exponentiation of steps 2403 and 2404 is $2 \times (T/2)^3 = T^3/4$. On the other hand, the amount of computation for one multiplication of c modulo n is (bit length of modulus n)×(bit length of modulus n), and hence, when the multiplication is executed by $2 \times \log_2 s$ times, the amount of computation is $2 \times \log_2 s \times T^2$. Specifically, while the basic amount of computation is $T^3/4$, the additional amount of computation is $(2 \times \log_2 s) \times T^2$, and a proportion therebetween is $(2 \times \log_2 s \times T^2)/(T^3/4) = (8 \times \log_2 s)/T$. In the case where, for example, $T = \log_2 n = 1024$, when an 8-bit value is used as the constant s, the proportion of the additional amount of computation is $64/1024 < 0.07$, and thus, the amount of computation is increased by approximately 7%. In this manner, the influence of the additional amount of computation on the entire amount of computation is negligibly small.

The additional cost of memory is a memory area $\log_2 s$ for storing the constant s and a memory area $\log_2 n$ of a work area W for executing the right-to-left binary method. When the parameter s has a value of approximately 8 bits, the sum of the additional memories is $8+\log_2 n$. As compared with the additional amount of memory of $1.5 \times \log_2 n$ for the countermeasure 3, considering that $\log_2 n \geq 1024$ in a general RSA parameter, $8+\log_2 n < 1.5 \times \log_2 n$, and thus, the processing with a smaller amount of additional memory may be realized in this example.

Example 5

FIG. 11 illustrates an algorithm used in Example 5. In this example, an error parameter s is given as a random number, and for calculating $c^s \pmod n$, multiplication is performed by $2 \times \log_2 s$ times by employing the left-to-right binary method (at steps 2507 through 2510).

This example is the same as Example 3 except for step 2500 where the parameter s is given as a random number. The additional cost of the amount of computation corresponds to the amount of computation for executing the left-to-right binary method and is given as $2 \times \log_2 s$. When $\log_2 n$ is expressed as T, the amount of computation for the modular exponentiation of steps 2503 and 2504 is $2 \times (T/2)^3 = T^3/4$. On the other hand, the amount of computation for one multiplication of c modulo n is (bit length of modulus n)×(bit length of modulus n), and hence, when the multiplication is executed by $2 \times \log_2 s$ times, the amount of computation is $2 \times \log_2 s \times T^2$. Specifically, while the basic amount of computation is $T^3/4$, the additional amount of computation is $(2 \times \log_2 s) \times T^2$, and a proportion therebetween is $(2 \times \log_2 s \times T^2)/(T^3/4) = (8 \times \log_2 s)/T$. In the case where, for example, $T = \log_2 n = 1024$, when an 8-bit value is used as the constant s, the proportion of the additional amount of computation is $64/1024 < 0.07$, and thus, the amount of computation is increased by approximately 7%. In this manner, the influence of the additional amount of computation on the entire amount of computation is negligibly small.

The additional cost of memory is a memory area $\log_2 s$ for storing the random number s and a memory area $\log_2 n$ of a work area W for executing the left-to-right binary method. When the parameter s has a value of approximately 8 bits, the sum of the additional memories is $8+\log_2 n$. As compared with the additional amount of memory of $1.5 \times \log_2 n$ preferable in the countermeasure 3, considering that $\log_2 n \geq 1024$ in a general RSA parameter, $8+\log_2 n < 1.5 \times \log_2 n$, and thus, the processing with a smaller amount of additional memory may be realized in this example.

Example 6

FIG. 12 illustrates an algorithm used in Example 6. In this example, an error parameter s is given as a random number, and for calculating $c^s \pmod n$, multiplication is performed by $2 \times \log_2 s$ times by employing the right-to-left binary method (at steps 2607 through 2610).

This example is the same as Example 4 except for step 2600 where the parameter s is given as a random number. The additional cost of the amount of computation corresponds to the amount of computation for executing the right-to-left binary method and is given as $2 \times \log_2 s$. When $\log_2 n$ is expressed as T, the amount of computation for the modular exponentiation of steps 2603 and 2604 is $2 \times (T/2)^3 = T^3/4$. On the other hand, the amount of computation for one multiplication of c modulo n is (bit length of modulus n)×(bit length of modulus n), and hence, when the multiplication is executed by $2 \times \log_2 s$ times, the amount of computation is $2 \times \log_2 s \times T^2$. Specifically, while the basic amount of computation is $T^3/4$, the additional amount of computation is $(2 \times \log_2 s) \times T^2$, and a proportion therebetween is $(2 \times \log_2 s \times T^2)/(T^3/4) = (8 \times \log_2 s)/T$. In the case where, for example, $T = \log_2 n = 1024$, when an 8-bit value is used as the constant s, the proportion of the additional amount of computation is $64/1024 < 0.07$, and thus, the amount of computation is increased by approximately 7%. In this manner, the influence of the additional amount of computation on the entire amount of computation is negligibly small.

The additional cost of memory is a memory area $\log_2 s$ for storing the random number s and a memory area $\log_2 n$ of a work area W for executing the right-to-left binary method. When the parameter s has a value of approximately 8 bits, the sum of the additional memories is $8+\log_2 n$. As compared with the additional amount of memory of $1.5 \times \log_2 n$ preferable in the countermeasure 3, considering that $\log_2 n \geq 1024$ in a general RSA parameter, $8+\log_2 n < 1.5 \times \log_2 n$, and thus, the processing with a smaller amount of additional memory may be realized in this example.

(Effects)

The effects attained by this embodiment will now be described. According to the present invention, all of the problems 1 through 3 may be addressed, and the security may be retained even when a parameter s, that is, a shift value, is revealed.

The problem 1 is the vulnerability against the attack 4, and the attack 4 may be prevented by the method described in this embodiment.

The problem 2 is the additional cost of the amount of computation, and when the method described in this embodiment is employed, the doubled amount of computation as required in the countermeasure 3 is not necessary, but the countermeasure against the attack 4 may be realized with overhead of the amount of computation as small as 1% through 7% as compared with that of the decryption method of FIG. 15 not employing the countermeasure.

The problem 3 is the additional cost of memory, and when Example 1 or 2 of the embodiment is employed, the additional amount of memory is merely $\log_2 s$ bits. While the additional memory of 1536 bits is necessary in the countermeasure 3 assuming that n has a bit value of 1024 bits, a small parameter s of approximately 2 or 3 is used in Example 1 or 2, and hence, additional memory of merely 2 bits is desired. Thus, Example 1 or 2 provides a superior method. Alternatively, when Example 3, 4, 5 or 6 of this embodiment is employed, the additional memory of $\log_2 n + \log_2 s$ bits is desired. Although this is a larger amount of additional memory than that of Example 1 or 2, when n has a bit value of 1024 and s has a bit value as small as approximately 8 bits, the additional memory amount is 1032 bits. Therefore, this method is superior to the countermeasure 3 where the additional memory amount is 1536 bits.

Moreover, since the shift value s used in this embodiment is a value that causes no problem in the security even if externally revealed, the decryption processor of this embodiment uses no fixed parameter that endangers the whole decryption processor when externally revealed. Accordingly, the present embodiment provides a superior method.

Furthermore, the decryption processor of this embodiment may be provided as a computer composed of a central processing unit, a main memory, and an auxiliary memory, etc. Also, a program for causing the computer used as the decryption processor to execute the aforementioned steps may be provided as a decryption processing program. When the program is stored in a computer-readable recording medium, the computer used as the decryption processor may execute the program. The computer-readable recording medium includes an internal memory device to be internally loaded in a computer, such as a ROM, a RAM and a Hard disk drive; a portable recording medium such as a CD-ROM, a flexible disk, a DVD disk, a magneto-optical disk and an IC card.

What is claimed is:

1. A decryption processor for calculating a plaintext m through decryption of a ciphertext c by using a first prime number p, a second prime number q, a public key e, and a private key d, the decryption processor comprising:

a first modular exponentiation part that calculates a value $m'_p$ through modular exponentiation modulo the first prime number p, wherein an exponent is a value obtained by shifting, with a numerical value s, a value $d_p$ calculated in accordance with $d(\mod(p-1))$, and a base is a value $c_p$ calculated in accordance with $c(\mod p)$;

a second modular exponentiation part that calculates a value $m'_q$ through modular exponentiation modulo the second prime number q, wherein an exponent is a value obtained by shifting, with the numerical value s, a value $d_q$ calculated in accordance with $d(\mod(q-1))$, and a base is a value $c_q$ calculated in accordance with $c(\mod q)$;

a composition part that calculates a value $m_s$ through calculation of $((u \times (m'_q - m'_p)(\mod q)) \times p + m'_p$ by using the values $m'_p$ and $m'_q$ calculated respectively by the first modular exponentiation part and the second modular exponentiation part and a private key u corresponding to a calculation result of $p^{-1}(\mod q)$; and a shift release part that calculates the plaintext m through calculation of $m_s \times (c^s (\mod n))(\mod n)$ by using the value $m_s$ calculated by the composition part.

2. The decryption processor according to claim 1, wherein the first modular exponentiation part, the second modular exponentiation part, and the shift release part use a random number of two bits or less as the numerical value s.

3. The decryption processor according to claim 1, wherein the first modular exponentiation part, the second modular exponentiation part, and the shift release part use a constant of two bits or less as the numerical value s.

4. The decryption processor according to claim 1, wherein the shift release part calculates the plaintext m by calculating $c^s(\mod n)$ by a left-to-right binary method.

5. The decryption processor according to claim 1, wherein the shift release part calculates the plaintext m by a right-to-left binary method.

6. A non-transitory computer readable medium recording a program causing a computer to execute a decryption processing method for calculating a plaintext m through decryption of a cipher text c by using a first prime number p, a second prime number q, a public key e, and a private key d, the method comprising:

calculating a value $m'.sub.p$ through modular exponentiation modulo the first prime number p, wherein an exponent is a value obtained by shifting, with a numerical value s, a value $d.sub.p$ calculated in accordance with $d(\mod(q-1))$, and a base is a value $c.sub.p$ calculated in accordance with $c(\mod p)$;

calculating a value $m'.sub.q$ through modular exponentiation modulo the second prime number q, wherein an exponent is a value obtained by shifting, with the numerical value s, a value $d.sub.q$ calculated in accordance with $d(\mod(q-1))$, and a base is a value $c.sub.q$ calculated in accordance with $c(\mod q)$;

calculating a value $m.sub.s$ through calculation of $((u.\text{times}.(m'.sub.q - m'.sub.p) \pmod q)).\text{times}.p + m'.sub.p$ by using the values $m'.sub.p$ and $m'.sub.q$ calculated respectively by the value $m'.sub.p$ calculation step and the value $m'.sub.q$ calculation step, and a private key u corresponding to a calculation result of $p.\text{sup}.-1 \pmod q$; and generating the plaintext m through calculation of $m.sub.s.\text{times}.(c.\text{sup}.s \pmod n)(\mod n)$ by using the value $m.sub.s$ calculated in the value $m.sub.s$ calculation step.

7. The non-transitory computer readable medium according to claim 6, wherein the value $m'_p$ calculation step, the value $m'_q$ calculation step, and the plaintext m calculation step use a random number of two bits or less as the numerical value s.

8. The non-transitory computer readable medium according to claim 6, wherein the value $m'_p$ calculation step, the value $m'_q$ calculation step, and the plaintext m calculation step use a constant of two bits or less as the numerical value s.

9. The non-transitory computer readable medium according to claim 6, wherein the plaintext m calculation step uses a left-to-right binary method to calculate $c^s(\mod n)$.

10. The non-transitory computer readable medium according to claim 6, wherein the plaintext m calculation step uses a right-to-left binary method.

11. A method for calculating a plaintext m through decryption of a cipher text c by using a first prime number p, a second prime number q, a public key e, and a private key d, to be executed by a computer, the method comprising:

calculating, by a processor of the computer, a value $m'_p$ through modular exponentiation modulo the first prime number p, wherein an exponent is a value obtained by shifting, with a numerical value s, a value $d_p$ calculated in accordance with $d(\mod(p-1))$, and a base is a value $c_p$ calculated in accordance with $c(\mod P)$;

calculating a value $m'_q$ through modular exponentiation modulo the second prime number q, wherein an exponent is a value obtained by shifting, with the numerical value s, a value $d_q$ calculated in accordance with $d(\mod(q-1))$, and a base is a value $c_q$ calculated in accordance with $c(\mod q)$;

calculating a value $m_s$ through calculation of $((u \times (m'_q - m'_p)) \mod q) \times p + m'_p$ by using the values $m'_p$ and $m'_q$ calculated respectively by the value $m'_p$ calculation step and the value $m'_q$ calculation step, and a private key u corresponding to a calculation result of $p^{-1} (\mod q)$; and generating the plaintext m through calculation of $m_s \times (c^s (\mod n))(\mod n)$ by using the value $m_s$ calculated by the value $m_s$ calculation step.

12. The method according to claim 11, wherein the value $m'_p$ calculation step, the value $m'_q$ calculation step, and the plaintext m calculation step use a random number of two bits or less as the numerical value s.

13. The method according to claim 11, wherein the value $m'_p$ calculation step, the value $m_q$ calculation step, and the plaintext m calculation step use a constant of two bits or less as the numerical value s.

14. The method according to claim 11, wherein the plaintext m calculation step uses a left-to-right binary method to calculate $c^s (\mod n)$.

15. The method according to claim 11, wherein the plaintext m calculation step uses a right-to-left binary method.

\* \* \* \* \*